(12) United States Patent
Schultz et al.

(10) Patent No.: US 9,391,986 B2
(45) Date of Patent: Jul. 12, 2016

(54) METHOD AND APPARATUS FOR PROVIDING MULTI-SENSOR MULTI-FACTOR IDENTITY VERIFICATION

(71) Applicant: Verizon Patent and Licensing Inc., Basking Ridge, NJ (US)

(72) Inventors: Paul T. Schultz, Colorado Springs, CO (US); Mark J. Hahn, Stow, MA (US); Robert A. Sartini, Colorado Springs, CO (US); Jeffrey H. Swinton, Mendham, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 53 days.

(21) Appl. No.: 13/907,421

(22) Filed: May 31, 2013

(65) Prior Publication Data

US 2014/0359722 A1    Dec. 4, 2014

(51) Int. Cl.
*H04L 29/06* (2006.01)
*H04L 9/32* (2006.01)

(52) U.S. Cl.
CPC .......... *H04L 63/0861* (2013.01); *H04L 9/3231* (2013.01)

(58) Field of Classification Search
CPC .................... H01L 63/0861; H01L 9/3231
See application file for complete search history.

(56) References Cited

U.S. PATENT DOCUMENTS

| 7,552,467 | B2 * | 6/2009 | Lindsay | 726/5 |
| 7,725,732 | B1 * | 5/2010 | Ballard | 713/186 |
| 8,793,790 | B2 * | 7/2014 | Khurana et al. | 726/22 |
| 2011/0047377 | A1 * | 2/2011 | Allen et al. | 713/168 |
| 2012/0060207 | A1 * | 3/2012 | Mardikar et al. | 726/4 |
| 2012/0198232 | A1 * | 8/2012 | Hannel et al. | 713/168 |
| 2012/0239950 | A1 * | 9/2012 | Davis et al. | 713/320 |
| 2014/0052681 | A1 * | 2/2014 | Nitz et al. | 706/46 |

FOREIGN PATENT DOCUMENTS

JP    2003-198537    *    7/2001    ............. G06F 15/00

* cited by examiner

*Primary Examiner* — Tri Tran

(57) ABSTRACT

An approach for multi-sensor multi-factor identity verification. An identity verification platform determines biometric data associated with a user from one or more sources. The one or more sources are associated with one or more respective network sessions. The platform generates one or more respective trust scores for the one or more sources, the one or more respective network sessions, or a combination thereof based on one or more contextual parameters associated with the user, the one or more sources, the one or more respective network sessions, or a combination thereof. Then the platform verifies an identity of the user based on the biometric data and the one or more respective trust scores.

20 Claims, 15 Drawing Sheets

METHOD AND APPARATUS FOR PROVIDING MULTI-SENSOR MULTI-FACTOR IDENTITY VERIFICATION

BACKGROUND INFORMATION

Sensor technology is becoming ubiquitous in an increasing array of services and applications. For example, biometric sensors can help a user to measure, monitor, track, and improve the user's health. Similarly, environmental sensors are used to monitor and generate weather data and other sensed characteristics of an environment. At the same time, improvements in communication technologies enable service providers to interconnect these sensors to provide even more sophisticated services. One area of development has been sensor-based identity verification. However, service providers face significant technical challenges to characterizing and ensuring the reliability, trustworthiness, integrity etc. of the data collected from these sensors, particularly when the resulting sensor data are used to support services such as identity verification and other identity-related services (e.g., electronic notarization services, electronic signature services, etc.).

Based on the foregoing, there is a need for an approach for multi-factor user identity verification that leverages sensor data arising from multiple sensor sources.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method, and software for multi-sensor multi-factor identity verification are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
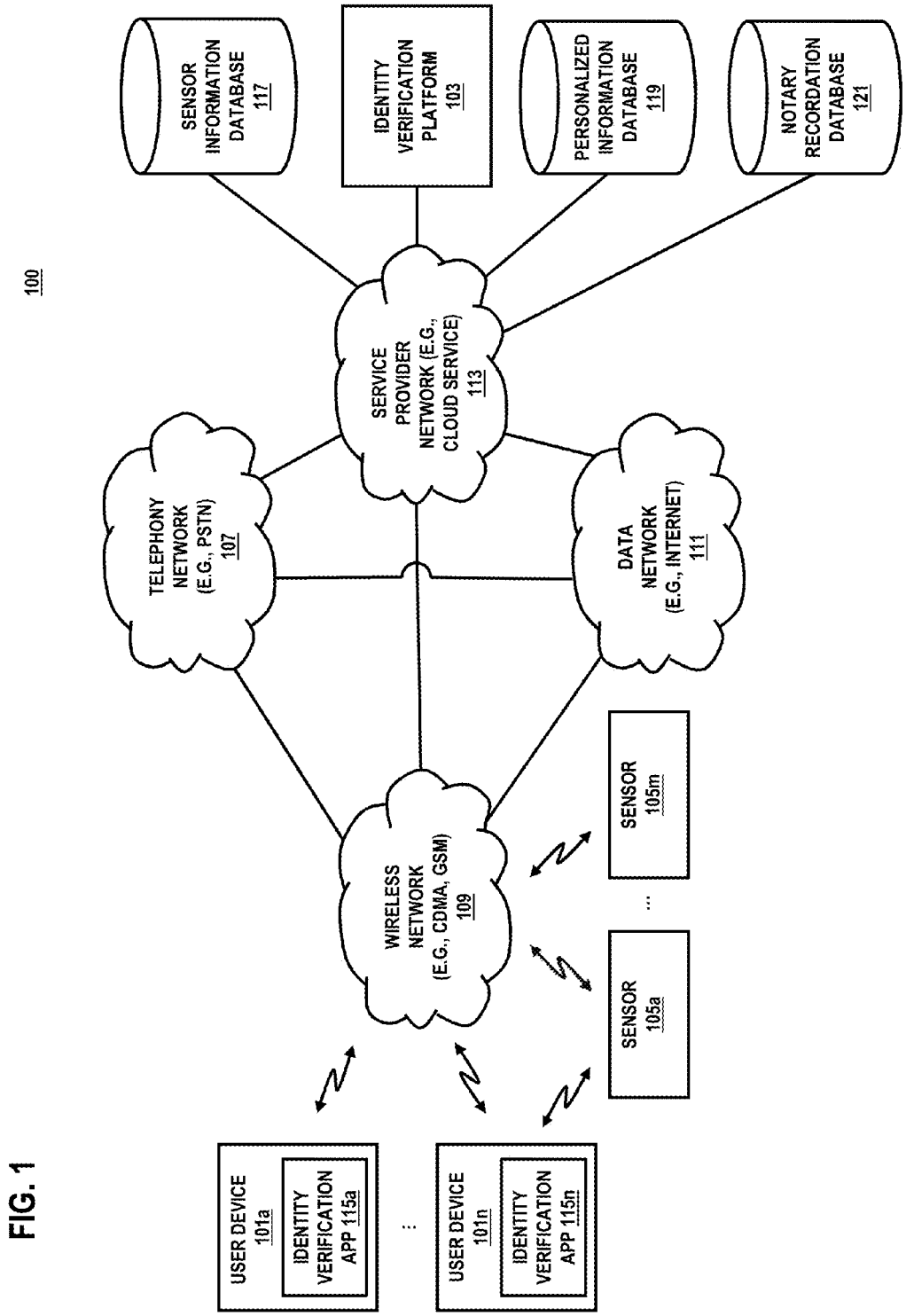
FIG. 1 is a diagram of a system capable of providing multi-factor user identity verification, according to one embodiment.

FIG. 1 is a diagram of a system capable of providing multi-factor user identity verification, according to one embodiment. Many services and applications rely on identity verification in order to provide access by users. For example, identity verification means can range from simple username/passwords to more complex user secrets or challenges. However, it is often the case that as the identity verification means becomes more complex or stronger, users generally face more burdensome identity verification procedures, thereby potentially leading to a poorer user experience. Accordingly, what is needed is an easy way for a user to verify that they are who they say they are (e.g., validate a user's identity claim). In some cases, there is also a need to determine a user's willingness to submit to the identity verification (e.g., based on whether the user is under duress).

Network service providers have unique opportunities to contribute to a biometric sensor and identity verification ecosystem for addressing these needs. In one embodiment, network service providers can provide biometric sensor networking, security and privacy capabilities for identity verification. Accordingly, a system 100 of FIG. 1 comprises one or more user devices 101a-101n (also collectively referred to as user devices 101) with connectivity to an identity verification platform 103 to provide user identity verification using multiple factors from multiple biometric sensors 105a-105m (also collectively referred to as sensors 105). In other words, the system 100 introduces a capability of providing an identity verification service so that a user (e.g., willing or unwilling) can verify that the user is whom the user says (e.g., validate a user's identity claim). By way of example, multiple biometric sensor factors that can be used to verify a person's identity (e.g., an identity of a person associated with a user device 101) include network information, session information, context information, data confidence/trust score calculations, and/or the like. It is contemplated that any parameter or characteristic of the sensors 105 and/or the network(s) over which they operate can be used as a factor for sensor-based identity verification.

In one embodiment, identity verification can include numerous measurements from the sensors 105 that can be intelligently combined to create confidence or trust scores for the measurements. For example, the system 100 can measure multiple factors in complex biometric sensor networks that include both peer-to-peer (P2P) and client-server network connections and communications sessions. The system 100 can then perform the identity verification based on the measurements and associated trust scores, in combination with other sensor factors. In one embodiment, the system 100 measures confidence/trust scores for (1) an overall identity verification, (2) the user devices 101 (3) the sensors 105, (4) network communications for carrying the sensor data, (5) sensor relationships, etc.

In one embodiment, the system 100 introduces a capability of measuring, calculating, and recording sensor relationships (e.g., trust relationships) using mathematical methods including transitivity, associativity, equivalence, greater than, less than, etc. The system 100 may also, for instance, include trust federation and/or trust negotiations among sensors 105, user devices 101, etc. in measuring, calculating, and/or recording sensor relationships. In another embodiment, the system 100 leverages sensor network knowledge in sensor trust determination calculations. For example, sensor network knowledge may include what other sensors 105 around a target sensor 105 detect about the target sensor 105 (e.g., connected/disconnected, okay/not okay, etc.).

In one embodiment, as further discussed below, the sensors 105 may include biometric and non-biometric sensors. By way of example, the non-biometric sensors may be found in the user's environment (e.g., home, car, business office, etc.). Sensor data from non-biometric sensors can then be used in addition to or in place of all or a portion of the biometric sensor data. Moreover, in one embodiment, the system 100 includes heterogeneous sensors 105 in identity verification, e.g., including sensors in and/or on a person's body and/or in the environment (e.g., surveillance camera capturing a person's gate, periocular region of the face, ear, iris, etc.; heartbeat via cardiac and pulmonary modulations detected using radar and/or Doppler effect).

In one embodiment, the system 100 provides for progressive identity verification as more and better sensor data becomes available. For example, in one use case, as a user walks to a scheduled appointment, sensors 105 can collect data about the user's walk, face, features, and context (e.g., location) prior to engaging in the appointment. In this way, the user's identity can be verified progressively as more data is collected to provide identity verification data to parties participating in the appointment. A doctor, for instance, can be progressively provided with information verifying a patient's identity as the patient walks to the doctor's office.

In one embodiment, the system 100 enables the creation or updating of a personal health record (PHR) for a user based on the collected biometric sensor data. In the context of PHRs, the system 100, for instance, can securely and intelligently enhance PHRs with sensor network data, sensor session data, sensor trust data, etc. as described with respect to various embodiments of the invention. This, in turn, enables users to measure, monitor, track, and improve their health. In addition, the system 100 is able to securely (e.g., based on identity verification) incorporate PHR baseline data to measure changes (e.g., diet, environment, medications, mood, etc.) against baseline personal biometric data. In one embodiment, the system 100 can semantically tag biometric and PHR data and attributes to facilitate appropriate inference, user privacy, user preference, and/or data sharing. Activity monitoring data, including the user's mobile device sensor data (e.g., accelerometer, gyroscopes, etc.) and network information (e.g., network-based location and communications activity) may be stored in a PHR. In some use cases, PHRs can be collected for post-mortem analysis to contribute to better medical diagnostics and/or treatments across populations (e.g., users can donate PHRs in a similar way to donating a user's body or organs to science).

In one embodiment, the system 100 enables the device to actively monitor and report the activity of a user. The system 100, for instance, can securely monitor, track, and report the activity of the user by continuously verifying the user's identity through other means. The system 100, may also require verification prior to active monitoring, tracking and reporting, but this could create security issues with newly acquired data, for instance, a user verifies their identity and a third party wrongfully procures the device used to acquire new data, the data would then be tainted. In another embodiment, the newly acquired data may continuously be tracked and verified against historical data without verification of user identity, treating newly acquired data with less confidence due to unknown data sourcing. Unless, sensors or devices are within a user's body, the acquired data will be less secure. For example, a user wearing a smartphone may verify their identity prior to acquisition of activity of a user, but without continued identification through other means, the data could be corrupted by wrongful procurement of the device or sensor by third parties. The activity data acquired could be of a user's gait as described above, audio or camera activity, network-based and gps based locations, sensor environments (e.g. sensors within a certain area of a device, such as known specific sensors within a user's body and known sensors in the location of the device), user activity patterns (e.g. commuting from home to work, exercising at the gym, and other scheduled and unscheduled activities user's do), etc.

In one embodiment, the system 100 enables the use of sources which may include device sensors (e.g. accelerometers, microphones, cameras, location sensors, gyroscopes, accelerometer, sensors in the body, magnetic compasses, etc.), network-based location associated with the user (e.g. network sessions data including strength, clarity, reliability, and other issues), and/or communication history associated with the user (e.g. historical use by the user through the same or different network sessions and sources). All of which may be combined to determine an activity related to the user. This activity may then be used to monitor user interactions and user health and report to user or other third parties based as required. This activity may also be used in verifying the user identification.

In one embodiment, the system 100 can leverage multi-sensor multi-factor identity verification and accompanying biometric data into a variety of service and applications including, e.g., electronic notary (eNotary)/electronic signing (eSigning) services, fraud detection and prevention services, and/or activity monitoring services. In one embodiment, the system 100 makes identity verification services and functions available to third party services and application via application programming interfaces (APIs). In one embodiment, the system 100 may provide services to verify physical identity artifacts (e.g., driver's license, passport, etc.) as well as previously known biometric information (e.g., fingerprints on record). By way of example, an electronic notary service or an electronic signature/signing service binds results of an identity verification to specific documents, transactions, etc. In one embodiment, an electronic notary service leverages sensor data (e.g., information available from user devices 101 like location, audio, imaging, etc.; and/or body and environmental sensors) to implement functionality including user identity verification, secure affidavit and acknowledgement signing, generation and secure recording of transaction serial numbers, and logging of electronic notary transactions. The functionality can be used to support, for instance, records retention, secure privacy-protected access to minimally required electronic Notary information, non-repudiation, etc.

In one embodiment, the system 100 enables an eNotary service to perform as a "witness" to the user's identity and willing participation in a transaction. As part of the willingness determination, the eNotary service includes duress detection capability that can utilize personal biometric sensor data, PHR data, environmental sensor data, contextual data, and the like to infer indications of user duress. In one embodiment, the eNotary service also incorporates security measures such as private networks, virtual private networks (VPNs), encryption, trust, tokens with attributes, user privacy, user preference, data classification and/or tagging, etc. Other security measures may include incorporating checksum(s), hash(es), encryption, tagging, and/or other techniques to encode and protect transaction data.

In one embodiment, the eNotary service of the system 100 includes an ability to create and record a Notary Identification Number (NIN) or other encoded metadata that contains a manifest of information about the eNotary transaction including: date/time, location(s), voice print(s), images (still and/or video), heterogeneous sensor data, eNotary user signature, eNotary user affidavit(s) and acknowledgement(s), eNotary transaction logs, etc. By way of example, the system 100 generates globally unique NINs by, for instance, encoding data like geo-location of the user in the NIN generation. For example, the system 100 can encode metadata that uniquely identifies transaction content, e.g., for a house purchase closing, this may include contracts, title, deed, survey, mortgage, affidavits, bank and tax documents, etc.

In one embodiment, metadata or other information associated with the manifest or transaction can be determined through optical code recognition (e.g., QR code recognition, barcode recognition, etc.) or other automated means. For example, the system 100 can also incorporate document scanning technologies (e.g., watermark reader like ones used at airports to validate driver's license, passports, etc.). In another example, the system 100 can account for user location proximity to physical artifacts by incorporating short-range communication technology (e.g., Near Field Communication (NFC)). In addition, the system 100 can account for location diversity of devices, audio/image recognition and recording, fingerprint recording and recognition on the user device 101, etc.

As described with respect to identity verification, the system 100 may also calculate trust and confidence scores for transactions submitted to the eNotary service.

In one embodiment, as with identity verification services, the system 100 supports multi-session/multi-network notarizing services. For example, the system 100 multi-session eNotary identity validation utilizes sensor data from sensors found in mobile devices (e.g., microphones, cameras, location sensors, gyroscopes, accelerometer, magnetic compasses, etc.) and biometric data from sensors on the body and in the environment (e.g., heart rate, blood pressure, electrocardiography (EKG), iris, ear, face, periocular, gait, etc.). Additionally or alternatively, the system 100 multi-session data may be used to implement a network-based activity monitoring and reporting system.

In one embodiment, the system 100 can implement the eNotary service as a virtual service (e.g., leveraging user devices 101) and/or as a physical service (e.g., as a kiosk and/or electronic notary machines (ENM)). By way of example, ENMs can be located at business locations where notary services may be needed such as doctor's offices, car dealerships, title companies, banks, post offices, etc. Additionally or alternatively, an ENM can be mobile (e.g., leverage postal delivery infrastructure to bring ENM to a user's physical location). In one embodiment, ENMs enable processing of physical as well as digital documents by utilizing technologies like cameras and/or scanners (including, e.g., optical character recognition (OCR) and/or other document imaging technology) and/or Near Field Communications (NFC).

In one embodiment, the system 100 can implement a "click-to-sign" service (e.g., either as a standalone service as a subset of the eNotary service) that verifies a user's identity (e.g., including authentication and authorization) and creates an eSignature. In one embodiment, the eSignature can include appropriate contextual parameters (e.g., date/time, IP address, location, user's username/password, user consent information, etc.). For example, user consent can be expressed as, e.g., a voice file of the user saying, "Okay to sign," "I agree," or some other indicator of consent. On creation of the eSignature, the system 100 can also create a unique transaction serial number (e.g., using techniques like checksums and/or hashes).

In one embodiment, the eNotary service associates traditional identity artifacts (e.g., driver's license, passport, etc.) with a user's biometric data by, e.g.: (1) enrolling the user's voice and/or face print biometric at the same time that the user's driver's license and/or passport is created; and/or (2) biometrically scanning the user's existing driver's license and/or passport at the time the user's voice and/or face biometric (or other biometric data) is enrolled. In one embodiment, the user's identity is validated prior to biometric enrollment.

In one embodiment, the system 100 enables validating a physical identity artifact (e.g., driver's license, passport, credit card, etc.) by using image recognition, face biometrics, and context, e.g., ID artifact picture and user face match, ID artifact home address and user location match, ID artifact phone and user's phone verification (e.g., SMS opt-in where an opt-in reply code may come from a different device like a PC or ANM), and/or ID artifact watermark verification. In one embodiment, verification of multiple physical forms of identity can increase the confidence in the identity verification.

In one embodiment, the eNotary service includes calculating, generating, and/or recording an electronic version of the traditional notary "seal" that will be used to annotate eNotary transaction document(s). For example, this can be accomplished by using mechanisms similar to those that describe transaction serial number generation discussed below.

In one embodiment, the eNotary service also includes using sensor technology to detect the difference between a picture of a face and the actual face by looking for variations in the time domain. Additionally, the eNotary service can implement live-ness testing by, for instance, having the user speak a challenge phrase (e.g., randomly generated and time bound) to a microphone and a camera capturing multiple frames of the user.

In one embodiment, if the eNotary service detects fraudulent activity, the system 100 can revoke verification information provided under the eNotary service. In this way, if additional or updated sensor data indicate concerns about a user's identity, the system 100 can revoke the identity verification (e.g., temporarily or permanently).

For the purpose of illustration, the user devices 101, the identity verification platform 103 and the sensors 105 communicate over one or more networks including a telephony network 107, a wireless network 109, a data network 111, a service provider data network 113, etc. In one embodiment, the user devices 101 may also use short range wireless technologies such as Near Field Communications (NFC), Bluetooth, WiFi, ZigBee, Z-Wave, etc. to communicate with the sensors 105 and other components of the system 100. In one embodiment, the identity verification platform 103 may interact with respective identity verification applications 115a-115n (also collectively referred to as identity verification applications 115) executing on the user devices 101a-101n to provide identity verification services. In one embodiment, the identity verification applications 115 may be used to collect sensor data, initiate identity verification, use identification results, and/or any other functions of the identity verification platform 103 or the system 100. It is noted that such applications can also be eliminated and the functions of the applications can instead be implemented via a browser accessing a website, which can be part of the identity verification platform 103.

In one embodiment, the system 100 may use network and/or session diversity among the user devices 101, the identity verification platform 103, the sensors 105, and other components of the system 100 as factors for identity verification. In the case of network diversity, for instance, different networks (e.g., peer-to-peer (P2P), client-server) can be used to obtain and compare sensor data from the sensors 105. For example, if sensor data obtained over different networks are consistent, then the system 100 may determine that there is higher confidence in identity verification resulting from the sensor data. Similarly, for session diversity, different communication sessions within the same network session among the user devices 101, the identity verification platform 103, the sensors 105, and other components of the system 100 can be used to obtain and compare sensor data for consistency.

In one embodiment, the system 100 may calculate confidence/trust scores for different legs or segments within a network or session for exchanging sensor data. For example, if a network path between the identity verification platform 103 and a sensor 105 includes hops between a first leg (e.g., between service provide network 113 and data network 111) and a second leg (e.g., between data network 111 and wireless network 109), the identity verification platform 103 can calculate separate confidence/trust scores for each individual leg. In one embodiment, combined trust scores represents an aggregation of the trust scores for the individual legs or segments. In one embodiment, the legs or segments can also be represented by application or operating system layers within the user devices 101 or the sensors 105. For example, if the sensor data travels from one application/software layer to another application/software layer within the user device 101 before being transmitted to the identity verification platform, then layer-to-layer traversal within the user device 101 can also represent individual legs or segments.

In one embodiment, the sensors 105a-105m may include biometric sensors and non-biometric sensors. Biometric sensors may include using cameras, microphones, gyroscopes, accelerometer, magnetic compasses, location sensors (e.g., GPS sensors), biochemical (e.g. hormones, bodily chemical levels, blood cell counts), electrocardiogram, other medical devices, etc. Non-biometric sensors may include cameras, scanners, etc.

According to one embodiment, these identity-related services may be included as part of managed services supplied by a service provider (e.g., a wireless communication company) as a hosted or a subscription-based service made available to users of the user devices 101 through the service provider data network 113, which, in one embodiment, may be a cloud network service. As such, the identity verification platform 103 may, for instance, be configured to aid notarized document submittal, payments, and other transactions. In this regard, the identity verification platform 103 may provide more secure and efficient transactions between parties and monitor, track and maintain personal health records.

In one embodiment, a user refers to a person, mobile device, or other possible parties requiring or needing user verification. In one embodiment, the term "sensor source" or "source" is used interchangeably with a sensor, scanner, camera, microphone, user input information, device information, etc. In one embodiment, biometric data comprises fingerprints, iris prints, face prints, voice prints, gait, DNA, heartbeat, blood pressure, neural, biochemical, etc. In one embodiment, identity verification data comprises documents, user identification, passwords, identifying marks, images, videos, audio, signatures, pins, answers to questions, locations, times, biometric data, etc. In one embodiment, a physical identity artifact include driver's licenses, passports, documents with signatures, images, bar codes, QR codes, Near Field Communication (NFC), etc. In one embodiment, network elements include communications between sensor-to-sensor, device-to-device, sensor-to-device, device-to-network, network-to-network, sensor-to-network, and vice versa.

As shown, the identity verification platform 103 may be part of or connected to the service provider network 113. In certain embodiments, the identity verification platform 103 may include (or have access to through the service provider network 113) a sensor information database 117, a personalized information database 119, and a notary recordation database 121. The sensor information database 117, personalized information database 119, and notary recordation database 121, in some embodiments, store data used to validate the identity of a user. In certain embodiments, the sensor information database 117, personalized information database 119, and notary recordation database 121 may be combined in one or multiple database objects.

The sensor information database 117 may, for instance, be utilized to access or store user information, including a user's biometric data such as gait, face print, eye/iris print, heartbeat, biochemical levels, neural patterns, ear, voice print, fingerprint, etc. This biometric data will be collected by sources such as sensors, cameras, etc. and be maintained by the sensor information database 117. Outlying data may be used to diagnose user health, user activity, fraud monitoring and prevention, and/or duress and to alert on any issues.

The personalized information database 119 may, for instance, be utilized to access or store user information, including a user's personal identification documents as sources including a user's driver's license, passport, birth certificate, social security card, QR code, bar code, NFC tag, etc. The personal information database 119 may also be utilized to access or store user schedule, location, time, date, calendar events, sources used, environment information (weather, indoor/outdoor, etc.), etc. The personal identification documentation may be collected by scanner, camera, microphone, NFC, etc. The personalized information database 119 may store and update a user's personal identification documentation, which may be used to analyze for counterfeit documents.

The notary recordation database 121 may, for instance, be utilized to access or store user information, including a user's identity verification data. Each instance of failure and verification is recorded in the database in order to track and further analyze to identify a user. Each instance may track the initiation location, date, time, user information used, sources and network sessions used in verifying a user's identification. Network sessions may include communication between sensors, devices, networks, and combinations thereof.

While specific reference will be made thereto, it is contemplated that the system 100 may embody many forms and include multiple and/or alternative components and facilities. For example, although various embodiments of identity verification are described using a mobile device, it is contemplated that the approach described herein may be used with other devices such as cash machines, personal computers, payment devices, medical devices, etc. In addition, although various embodiments of identity verification describe multiple source identification, identification could also be made through a single source.

It is recognized that, in identity verification on mobile devices, uncertainty of source and coercion/willingness of user may be issues. Uncertainty of source applies to sensor issues, network session issues, and identity data issues, whereas coercion may be from a third-party forcing a user to act. As such, trust and confidence scores are generated in order to evaluate dependability of source sensors, network sessions, and user distress/duress. For example, to sign a contract, a notary is generally necessary. With identity verification by opening an eNotary application, a user may be allowed to sign a contract electronically after identity verification through multiple sources. These sources may include fingerprinting at a scanner device, driver's license scanning at a separate scanner, looking into a mobile device camera for iris prints, analyzing a user's voice from a microphone, and analyzing a user's gait when walking In one embodiment, a user's gait might also be determined by the user's mobile device accelerometer, gyroscopes and compass along with a nearby video camera video of the user walking. After verifying the identity of the user the application would allow for an electronic signature to be placed in the contract, otherwise an error would be sent. Throughout, a user's gait, voice, face, blood pressure, bodily chemicals, hormones, and/or any other biometric indicator could be monitored to determine if the user is believed to be under duress. If determined to be under duress (e.g., based on analysis of biometric data), the system 100 may prevent the user from signing the document. Additionally or alternatively, user gait information may be used to implement a mobile device and network-based activity monitoring and reporting system. Verification or failure would then be stored in the notary recordation database 121. In certain embodiments, the notary recordation database 121 would also store, time, location, sources of verification, network sessions used, trust scores determined, confidence scores determined, or combinations thereof.

In one embodiment, a user can launch an identity verification application 115 (e.g., an eNotary application) to request identity verification for signing notary required or other high value documents. Under this scenario, the application 115 communicates with the identity verification platform 103 to provide for notarization of a user by verifying the user via multi-sensor multi-factor data (e.g., data collected directly from sensors 105 or previously stored in the sensor information database 117, personalized information database 119, and/or notary recordation database 121). The user might also specify specific sources and network sessions on which to perform the identity verification. In one embodiment, the identity verification further secures a document eSigning by comparing historical and/or baseline user data against current data in order to determine if the user is experiencing duress or possibly other health conditions. The separate application of other sources and/or other network sessions may also be used to increase or decrease the value or trustworthiness of applied sources and network sessions in verifying a user's identity.

In this example, the user device 101 is a mobile device (e.g., smartphone, tablet, netbook, laptop, wearable computer, etc.) that may also be configured to utilize a browser to communicate with the identity verification platform 103. Among other functions, the identity verification platform 103 can determine physical identity artifacts or documents (or other identity verification images, NFC data, sounds or movements) through scanned, communicated, pictured or recorded methods as compared from, for instance, databases 117, 119 and/or 121. The identity verification platform 103 can also modify, add, or analyze data within the databases 117, 119 and/or 121. The identity verification platform 103 also determines the user's other possible network sessions and sources that might be utilized.

In one embodiment, the identity verification platform 103 may also be used for validating mobile device transactions (e.g., payments, access to Electronic Health Records (EHR), fraud prevention, facility access, etc.) to determine the user's identification prior to transaction and/or determine user duress during a transaction. In one embodiment, a transaction request may automatically, without user action, request user identity verification. For example, if the transaction occurs at a bank or specific institution and the user's request is initiated, the application for transaction then automatically initiates identity verification. If identification is verified then the identity verification platform 103 may also check for duress, if no duress, the transaction goes through, if duress is found the identity verification is blocked. In another embodiment the user device 101 may communicate directly with sensors 105 for collecting identity verification data. In another embodiment the sensors 105 may communicate directly with each other and the identity verification platform 103 to collect identity verification data.

In one embodiment, a payment request may automatically, without user action, request user identity verification. For example, if the payment occurs at a retailer and the user's payment request is initiated, the application for payment then automatically initiates identity verification. If identification is verified then the identity verification platform 103 may also check for duress, if no duress, the payment goes through, if duress is found the identity verification is blocked. In another embodiment the user device 101 may communicate directly with sensors 105 for collecting identity verification data. In another embodiment the sensors 105 may communicate directly with each other and the identity verification platform 103 to collect identity verification data.

In one use case, identity verification can be performed on a physical identity artifact such as a driver's license. For example, the user scans the magnetic bar or the front of the driver's license to authenticate it and record the user data or takes a picture of the driver's license. The identity verification platform 103 analyses the picture or scan of the driver's license and compares against information stored in the personalized information database. The identity verification platform 103 then evaluates the source scanner or camera (e.g., sensors 105 and/or user device 101) and the network sessions created to receive the information by creating a trust score for each segment. For example, if the system 100 knows the camera has lower capabilities for detail or the scanner does not scan correctly, then the trust score for each would be lower than a perfect camera/picture and scanner. This information in conjunction with the method of transmission through network session, such as radio transmission between each source to the mobile device and that device to the cell tower by cellular phone transmission. In one embodiment, communications characteristics such as strength of signal, communication loss, cell tower identity, etc. may be used to determine the trust score for each network session. The identity verification platform 103 then accesses the databases 117, 119, and 121 to analyze the identity data to determine similarity or difference from baseline data of the user (e.g., the user's driver's license data as previously scanned or stored). In comparing the two, the current scan or picture and the baseline scan or picture, the data is compared and the trust scores evaluated, and if not close enough to being the same the identity and trust scores are too low, verification fails and payment application is notified. If the user identity is verified by the driver's license then the payment application may continue with payment. In other embodiments, the driver's license identity verification may also be combined with a secondary driver's license data network session or source, such as taking a picture and scanning the license. In other embodiments, the driver's license may be a single source in combination with the user's schedule, pin, password, voiceprint and/or voice password, fingerprint, and/or gait. All of which would combine to create a confidence score to establish the current identification data of the user to obtain a better identity verification of the user.

For illustrative purposes, the networks 107-113 may be any suitable wireline and/or wireless network, and be managed by one or more service providers. For example, telephony network 107 may include a circuit-switched network, such as the public switched telephone network (PSTN), an integrated services digital network (ISDN), a private branch exchange (PBX), or other like network. Wireless network 109 may employ various technologies including, for example, long term evolution (LTE), code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 111 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 107-113 may be completely or partially contained within one another, or may embody one or more of the aforementioned infrastructures. For instance, the service provider network 113 may embody circuit-switched and/or packet-switched networks that include facilities to provide for transport of circuit-switched and/or packet-based communications. It is further contemplated that networks 107-113 may include components and facilities to provide for signaling and/or bearer communications between the various components or facilities of system 100. In this manner, networks 107-113 may embody or include portions of a signaling system 7 (SS7) network, or other suitable infrastructure to support control and signaling functions.

Figure 2:
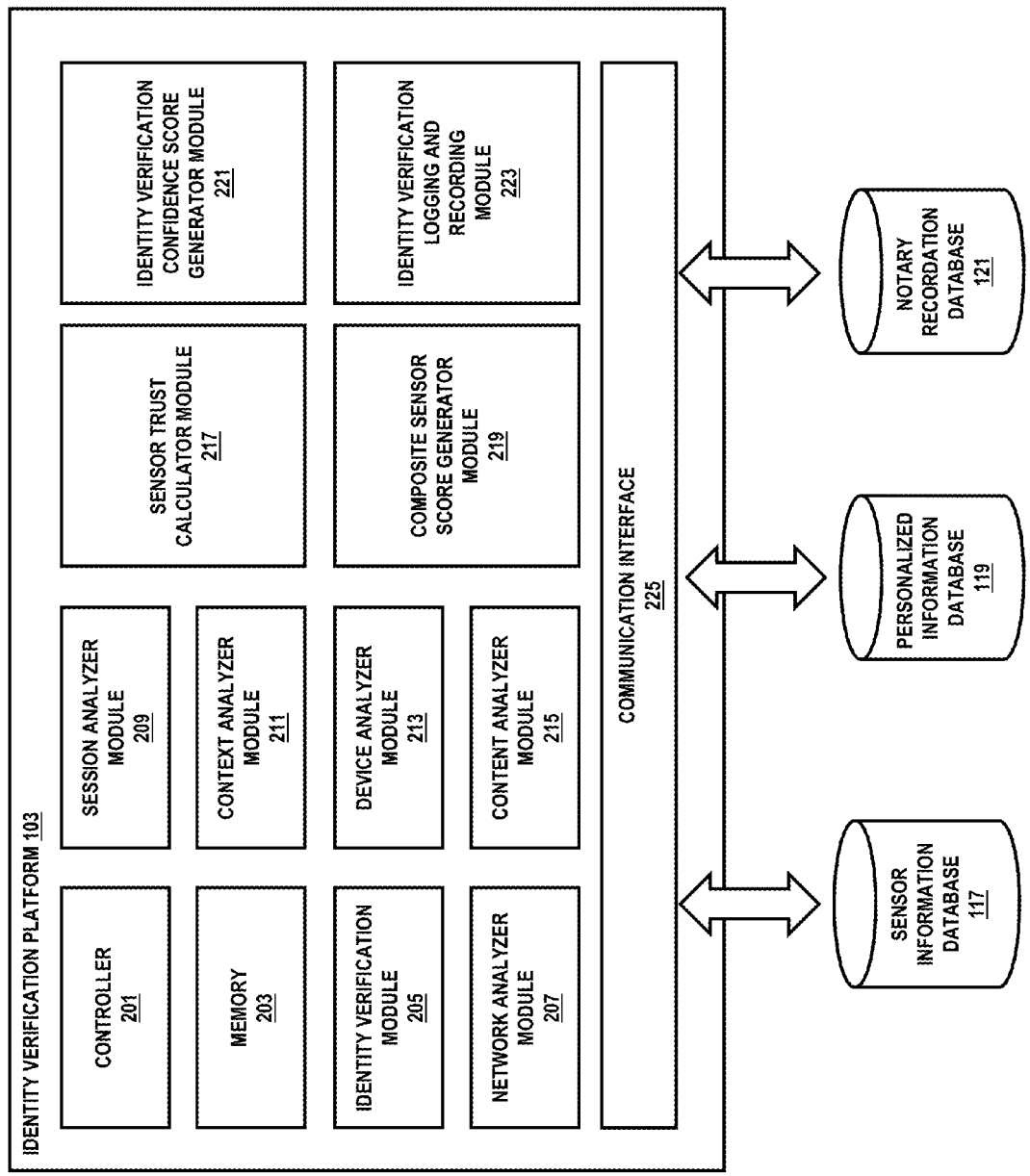
FIG. 2 is a diagram of components of an identity verification platform, according to one embodiment.

FIG. 2 is a diagram of components of an identity verification platform, according to one embodiment. By way of example, the identity verification platform 103 includes one or more components for providing user identity verification. It is contemplated that the functions of these components may be combined in one or more components or performed by other components of equivalent functionality. In this embodiment, the identity verification platform 103 includes a controller 201, a memory 203, an identity verification module 205, a network analyzer module 207, a session analyzer module 209, a context analyzer module 211, a device analyzer module 213, a content analyzer module 215, a sensor trust calculator module 217, a composite sensor score generator module 219, an identity verification confidence score generator 221, an identity verification logging and recording module 223, and a communication interface 225.

The controller 201 may execute at least one algorithm (e.g., stored at the memory 203) for executing functions of the identity verification platform 103. For example, the controller 201 may interact with the identity verification module 205 to verify the identity of the user. The identity verification module 205 may work with the other modules to obtain and analyze such information in order to determine the user's identity.

In certain embodiments, the identity verification module 205 may work with the network analyzer module 207 to determine which network elements are used and the trust of each network element used. The network analyzer module 207 may also aid the identity verification module 205 in verifying the user's identity by strengthening or weakening the confidence in identity verification data collected through the network elements used. For example, the network analyzer module 207 can aid in determining to not use identity verification data collected from a sensor which is using a weak network connection or aid in determining to have greater confidence in identity verification data collected from a sensor which is using a strong network connection. A weak versus strong network connection may be based on history of reliability, trustworthiness, and integrity. Lack of history, security and integrity are all reasons a network connection may be considered weak. A long history of reliability, strong security and good integrity are all reasons a network connection may be considered strong.

In certain embodiments, the identity verification module 205 may work with the session analyzer module 209 to determine the dependability of a session (session context, location, history, date/time, etc.), session frequency, and inter-sensor confidence of a request for identity verification). The session analyzer module 209 may also edit, add or remove previous request information in the personalized information database 119. Identity verification request information may be stored and called upon to determine a context, frequency and confidence based on other sensors. These may also be used to determine if the request is made in an unusual way thus making confidence in the session reduced or if in a standard/common way making confidence in the session stronger.

In certain embodiments, the identity verification module 205 may operate with the context analyzer module 211 to determine the dependability of a session through context. Used in conjunction with prior user scheduling a session confidence may be weakened or strengthened based on where the request is made (at work, or at a bank will lead to stronger confidence, whereas in a rural location or a location known for fraudulent activity will lead to less confidence), when the request is made (during normal work hours will lead to stronger confidence, whereas at a time when user is not usually awake will lead to less confidence), and how often the request is made (based on history of requests should a user make a request every day at the same time Monday through Friday and the request occurs at that same time will lead to stronger confidence, should the request occur on a Sunday at the same time will lead to weaker confidence).

In certain embodiments, the identity verification module 205 may operate with the device analyzer module 213 to determine the dependability of a sensor. The device analyzer module 213 uses the sensor information database 105 to determine a dependability of a specific sensor device model. The strength or weakness of each device determines a base dependability. For example, a video camera model may have a video that is more detailed (stronger confidence) or less detailed (weaker confidence). In another example, a biometric sensor may be more (stronger confidence) or less accurate (weaker confidence). Additionally or alternatively, device analyzer module 213 may determine the dependability of a user device 101.

In certain embodiments, the identity verification module 205 may operate with the content analyzer module 215 to determine dependability of the sensor identification data and/ or sensor data. The content analyzer module 215 uses the personalized information database 107 to edit, add, and remove identity verification data collected from sensors 105*a-m*. Based on a history of the collected data any new identity verification data may be determined to be useful (stronger confidence) or be aberrant (less confidence) even possibly leading to data removal due to greater deviance of the identity verification data. Also using the importance of the sensor data to determine stronger or weaker confidence.

In certain embodiments, the identity verification module 205 may operate with the sensor trust calculator module 217 to determine a trust score for a sensor. The sensor trust score may use information collected by the network analyzer module 207, session analyzer module 209, context analyzer module 211, device analyzer module 213, and content analyzer module 215 to determine a trust score for a sensor. The trust score would take account of connection history, sensor sessions and data, status of sensor, trust of sensor, location of request, location of sensor, importance of sensor data, etc.

In certain embodiments, the identity verification module 205 may operate with the composite sensor score generator module 219 to determine a trust score for a combination of sensors. The trust score may use information collected by the context analyzer module 211, device analyzer module 213, and content analyzer module 215 to determine a trust score for multiple sensors. For example, a user's gait might be determined through multiple video cameras in a location or a single video camera in conjunction with a location sensor (e.g., GPS sensor) and accelerometer and/or gyroscope on a mobile device to determine a trust score. Additionally or alternatively, user mobile device sensor and gait data may be used to implement a network-based activity monitoring and reporting system. Use of this information for identity verification may be used in the authentication process, on its own based off historical data, or in conjunction with other methods of authentication such as fingerprinting.

In certain embodiments, the identity verification module 205 may operate with the identity verification confidence score generator module 221 to determine a confidence score. The confidence score may use information collected by the network analyzer module 207, session analyzer module 209, context analyzer module 211, device analyzer module 213, content analyzer module 215, sensor trust calculator module 217, composite sensor score generator module 219, and even identity verification logging and recording module 223 to determine a confidence score for all sensor(s) and network connections used in verifying a user identity.

In certain embodiments, the identity verification module 205 may operate with the identity verification logging and recording module 223 to record and track identity verification requests. Each request is recorded based on verification or failure, location of request, time/date of request, sensors used, network elements used, sessions used, etc. Basically recording anything used in making the identity verification determination.

Figure 3:
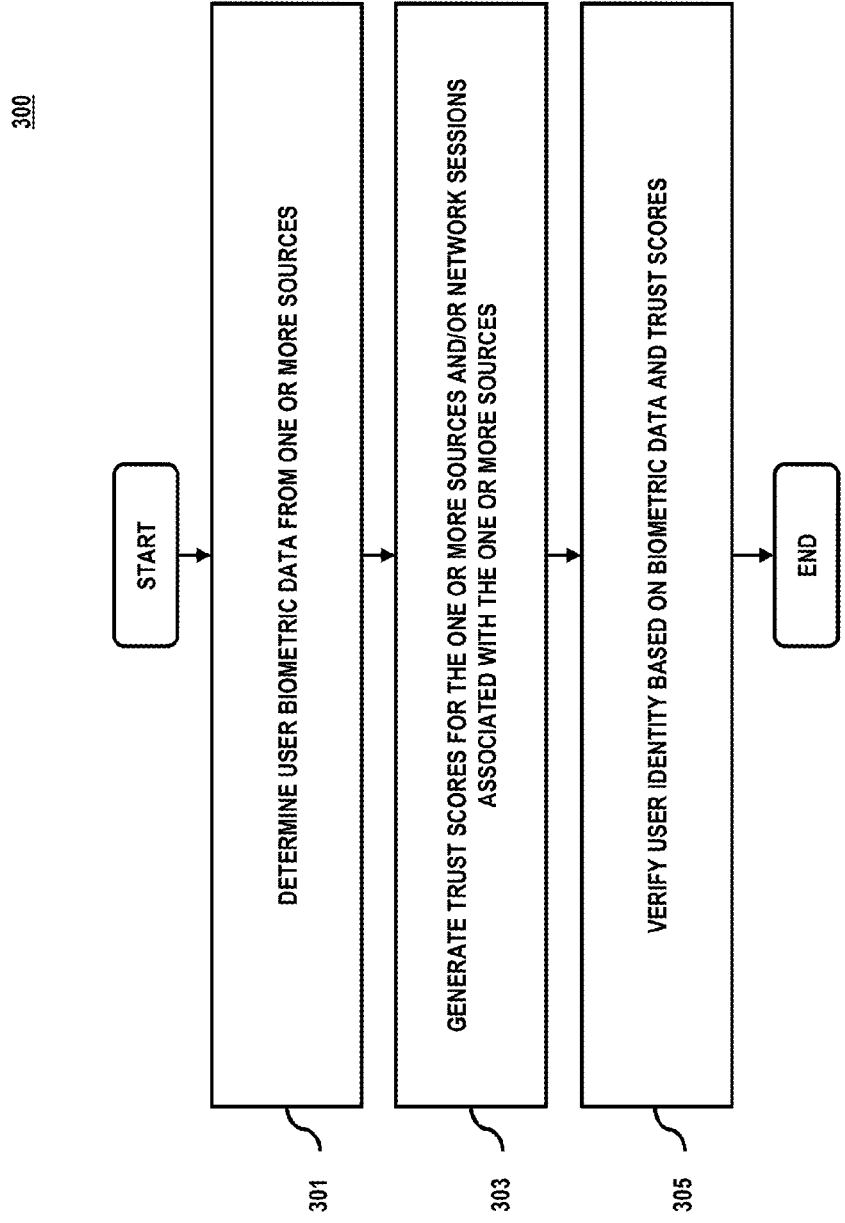
FIG. 3 is a flowchart of a process for providing multi-factor identity verification, according to one embodiment.

FIG. 3 is a flowchart of a process for providing multi-factor identity verification, according to one embodiment. For the purpose of illustration, process 300 is described with respect to FIG. 1. It is noted that the steps of the process 300 may be performed in any suitable order, as well as combined or separated in any suitable manner. In one embodiment, the identity verification platform 103 performs the process 300. In addition or alternatively, the identity verification application 115 may perform all or a portion of the process 300.

As shown in FIG. 3, in step 301, the identity verification platform 103 determines biometric data associated with a user from one or more sources (e.g., sensors 105). In one embodiment, the one or more sources are associated with one or more respective network sessions. In one embodiment, the biometric data includes historical biometric data, newly collected biometric data, or a combination thereof. For example, the identity verification platform 103 may establish a network session with the sensors 105 or other source of sensor data (e.g., user devices 101 and/or databases 117-121). In one embodiment, the network session may be a P2P network session, a client-server network session, and/or any other network session type supported by the system 100.

In one embodiment, heterogeneous biometric data can be combined to create composite biometrics to support identity verification. For example, a surveillance camera in the environment can capture face recognition and walking stride and cadence (i.e., gait) biometrics. Further in this example, the accelerometer and/or gyroscopes in the user's mobile device (e.g., user device 101) can also measure gait. These two gait biometrics (e.g., local via mobile device, and remote via surveillance camera) can be intelligently combined to create a composite gait biometric. Other examples of composite biometrics include: eyebrow+iris, voice+face, location+gait (e.g., as a user arrives at a location), and the like. It is noted that the examples of composite biometrics are provided for illustration and are not intended as limitations. In one embodiment, one composite biometric (e.g., composite gait biometric) can then be selectively combined with other data to create additional composite biometrics. The identity verification platform 103 can then apply criteria (e.g., context, trust and confidence scores, etc.) in the creation of composite biometrics. Additionally or alternatively, user mobile device sensor and gait data may be used in combination with network information (e.g., network-based location, communications history) to implement a network-based activity monitoring and reporting system.

In one embodiment, some biometrics (e.g., voice biometrics, face biometrics, fingerprint biometrics, etc.) can be obtained from enrolled sources. Biometric enrollment may occur at appropriate times and/or places such as passport issuance centers, department of motor vehicles, etc. For example, enrolled biometric data can be associated with traditional identity artifacts (e.g., driver's license, passport, etc.). One mechanism to accomplish this may be, for instance, to enroll the user's face print biometric at the same time that the user's driver's license, passport, or other identity document is created. Alternatively, the user's existing driver's license and/or passport may be biometrically scanned at the time the user's face biometric is enrolled. Additionally or alternatively, the enrolled biometric data may be obtained from only trusted enrollment sources which may include agencies or organizations that are trusted to perform biometric enrollment.

In step 303, the identity verification platform 103 generates one or more respective trust scores for the one or more sources (e.g., sources of sensor data such as sensors 105), the one or more respective network sessions, or a combination thereof based on one or more contextual parameters associated with the user, the one or more sources, the one or more respective network sessions, or a combination thereof. In one embodiment, the trust score is based, at least in part, calculating a network communication confidence score. The network communication confidence score, in turn, is based on, for instance, a network confidence score, a session confidence score, and a device confidence score. In one embodiment, the confidence scores reflect the calculated reliability and/or trust worthiness of the associated network component.

In one embodiment, network communication confidence can be calculated according to the following:

NetworkCommunicationConfidence=NetworkConfidence
($W$network)+SessionConfidene ($W$session)+DeviceConfidence($W$device)

In one embodiment, network confidence (e.g., NetworkConfidence(Wnetwork)) is calculated as follows:

NetworkConfidence=$D1$+$D1$Port+$NW$+$D2$Port+$D2$

Where:
D1=Device 1
D1Port=Device 1 Port (e.g., IP address and Device Port)
NW=network between Device 1 and Device 2
D2Port=Device 2 Port (e.g., IP address and Device Port)
D2=Device 2

In one embodiment, network confidence is calculated with greater weight placed on the above factors as follows:

NetworkConfidence=$a$*$D1$+$b$*$D1$Port+$c$*$NW$+ $d$*$D2$Port+$e$*$D2$

Where 'a,' 'b,' 'c,' 'd' and 'e' represent factoring weights and in many cases, 'c' weighed much more heavily since NW should be valued more.

In one embodiment, session confidence (e.g., SessionConfidence(Wsession)) is calculated as follows:

SessionConfidence=SessionContext(e.g., location, history, date/time, etc.)+PriorSessionFrequency+ Inter-SensorConfidence(e.g., confidence of sensors around session that session is valid)

In one embodiment, device confidence (e.g., DeviceConfidence(Wdevice)) is calculated as follows:

DeviceConfidence=DeviceInfo(e.g., device ID, IP address, device owner, etc.)+DeviceContext(e.g., location, history, date/time, etc.)

In one embodiment, the identity verification platform 103 may calculate a confidence or trust score for collected biometric data. For example, the biometric data confidence score is calculated as follows:

DataConfidence=[$DC1$($W1$)+$DC2$($W2$)+$DCn$($Wn$)]/$n$

Where:
DCn=DataConfidenceScoren (e.g., Data n checksum, Data n source, Data n history, etc.)
Wn=Weightn (e.g., trust, location, importance of Data n)

In one embodiment, the identity verification platform 103 may calculate a sensor trust score as follows:

SensorTrustScore=[$S1$($W1$)+$S2$($W2$)+$Sn$($Wn$)]/$n$

Where:
Sn=SensorScore=(e.g., connection history and status of Sensor n)
Wn=Weightn (e.g., trust, location, importance of Sensor n)

In one embodiment, the identity verification platform 103 determines one or more confidence scores for one or more respective legs of the one or more network sessions. For example, a leg or segment of the network session may span from one component to another component of the network. In one embodiment, components for defining legs or segments of a network or session can include physical and virtual components such as user devices 101, network devices, IP addresses, physical or virtual communications ports, application layers, operating system layers, etc. By calculating scores on a leg-by-leg basis, the identity verification platform 103, for instance, is able to determine trust/confidence scores at a greater level of granularity within a network or a network session, and identify specific legs or segments that raise potential concerns with respect to identity verification.

In one embodiment, the identity verification platform 103 determines non-biometric data associated with the user, an environment associated with the user, or a combination thereof. In this embodiment, the verifying of the identity of the user is further based on the non-biometric data.

In step 305, the identity verification platform 103 verifies an identity of the user based on the biometric data and the one or more respective trust scores.

Figure 4:
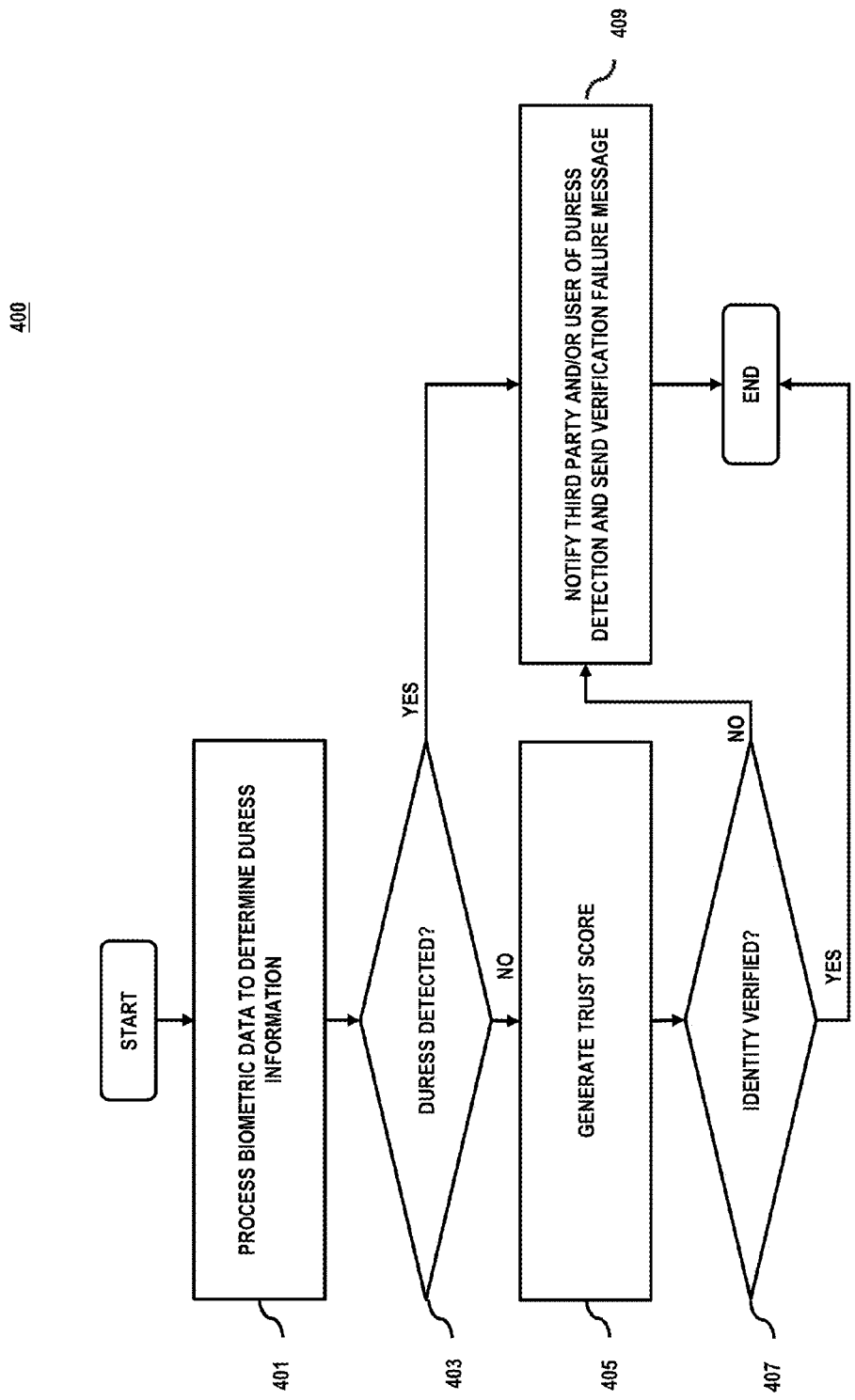
FIG. 4 is a flowchart of a process for determining user duress information for identity verification, according to one embodiment.

FIG. 4 is a flowchart of a process for determining user duress information for identity verification, according to one embodiment. For the purpose of illustration, process 400 is described with respect to FIG. 1. It is noted that the steps of the process 400 may be performed in any suitable order, as well as combined or separated in any suitable manner. In one embodiment, the process 400 is performed following the determination of biometric sensor data as described with respect to the process 300 of FIG. 3. In one embodiment, the identity verification platform 103 performs the process 400. In addition or alternatively, the identity verification application 115 may perform all or a portion of the process 400.

In step 401, the identity verification platform 103 processes biometric data to determine duress information associated with the user. The identity verification platform 103 then determines whether it has detected indications of duress in the user's biometric data (step 403). In one embodiment, the verifying of the identity of the user is further based on the duress information. For example, if duress is not detected, the identity verification platform 103 generates trust scores for the biometric data as previously described (step 405), and then determines whether the biometric data and associated trust scores support verification of the user's identity (step 407).

If the identity verification platform 103 detects indications of duress and/or fails to verify the user's identity based on the biometric data and trust scores, the identity verification platform 103 notifies third party and/or user of duress detection and sends a verification failure message (step 409). Additionally, detection of duress may trigger appropriate events, e.g., notification to healthcare professionals, law enforcement (e.g., in the case of a distressed convenience store lone worker), and/or the user's family members of duress detection.

Figure 5:
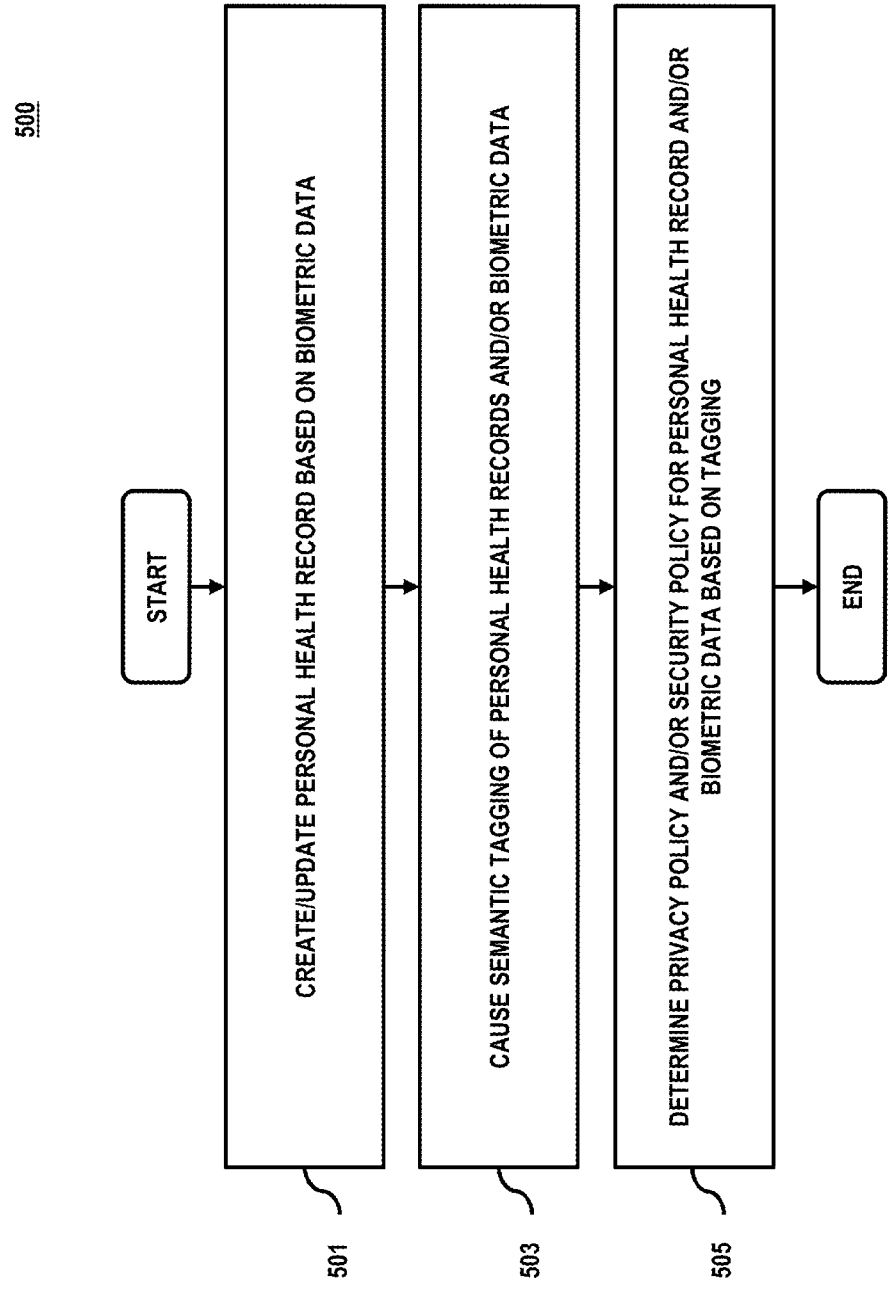
FIG. 5 is a flowchart of a process for creating and/or updating personal health records based on biometric data collected for identity verification, according to one embodiment.

FIG. 5 is a flowchart of a process for creating and/or updating personal health records based on biometric data collected for identity verification, according to one embodiment. For the purpose of illustration, process 500 is described with respect to FIG. 1. It is noted that the steps of the process 500 may be performed in any suitable order, as well as combined or separated in any suitable manner. In one embodiment, the process 500 is performed following the determination of biometric sensor data and verification of a user's identity as described with respect to the process 300 of FIG. 3. In one embodiment, the identity verification platform 103 performs the process 500. In addition or alternatively, the identity verification application 115 may perform all or a portion of the process 500.

In step 501, the identity verification platform 103 creates or updates a personal health record for the user based on the collected biometric data, the verifying of the user identity, or a combination thereof. For example, data from personal biometric sensors 105 (e.g., sensors 105 for monitoring vital signs) can be owned and/or controlled by an individual user in a personal health record (PHR). In one embodiment, a PHR may contain biometric data including, e.g., pulse, blood oxygenation, physical activity, blood pressure, blood glucose, electrocardiography (ECG), perspiration rate/galvanic skin response, body temperature, voice print, face print, fingerprint, breath, etc. Users can assemble, for instance, their own network of biometric sensors 105 and use their data to monitor, track, and improve their health. In one embodiment, a PHR may also include personal full genome sequence for use in predictive, personalized, and precision medicine. PHR data may also provide baseline measurements that may help measure effects of changes on the person, e.g., adjusting a medication, diagnosing a condition, monitoring and/or encouraging user activity, or optimizing the user's diet. Accordingly, biometric data in PHRs are typically highly personal to individual users and can be used for identity verification purposes.

In step 503, the identity verification platform 103 causes a semantic tagging of the personal health record, the biometric data, or a combination thereof. By way of example, PHR data may be semantically tagged, including data confidentiality tagging. In one embodiment, the benefits of such tagging may include increased data privacy protection, satisfying personal preferences, the ability to appropriately share some PHR data, etc.

In step 505, the identity verification platform 103 determines a privacy policy, a security policy, or a combination thereof for the personal health record, the biometric data, or a combination thereof based on the semantic tagging. In one embodiment, tagging may include data classifications such as: (1) Unclassified (U), (2) Confidential (C), (3) Secret (S), (4) Top Secret (TS), etc. These classifications then can be used to determine what type of sharing or access is available based on associated privacy and/or security policies. For example, PHR data classified as Unclassified might be shared with social and/or medical sites to add to the body of knowledge and collective wisdom of individuals that share a particular health condition.

In one embodiment, historical PHR data may enable individuals to infer causes of conditions (e.g., food-related illnesses) and/or predict health issue occurrences (e.g., heart attack via detection of circulating endothelial cells (CECs) in the blood). As previously noted, in one embodiment, depending on the tagging, PHR data may also be used post-mortem to contribute to better medical diagnostics and treatments across populations.

Figure 6:
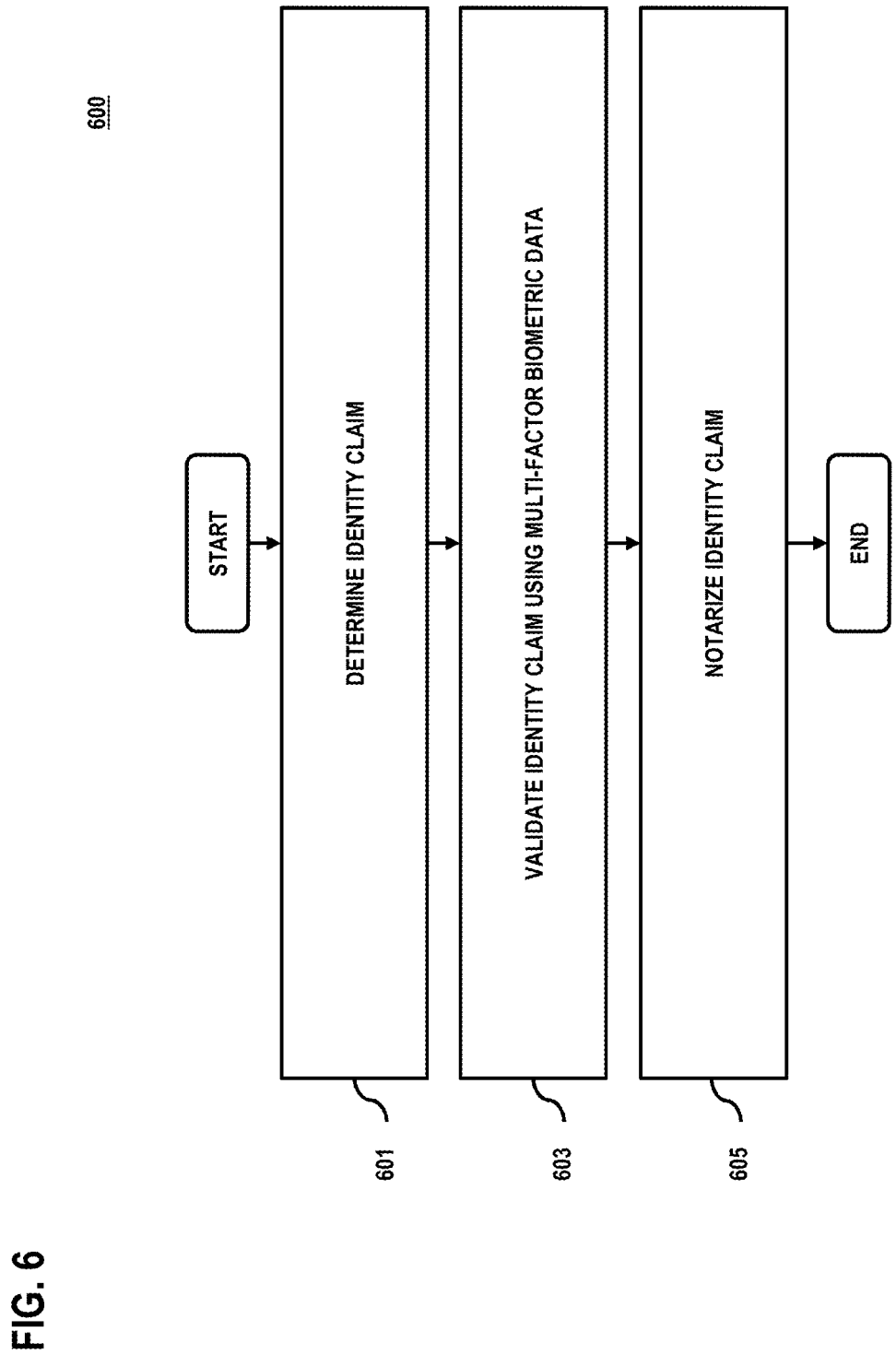
FIG. 6 is a flowchart of a process for providing an electronic notary service based on multi-factor biometric data, according to one embodiment.

FIG. 6 is a flowchart of a process for providing an electronic notary service based on multi-factor biometric data, according to one embodiment. For the purpose of illustration, process 600 is described with respect to FIG. 1. It is noted that the steps of the process 600 may be performed in any suitable order, as well as combined or separated in any suitable manner. In one embodiment, the process 500 is performed in combination with the determination of biometric sensor data and verification of a user's identity as described with respect to the process 300 of FIG. 3. In one embodiment, the identity verification platform 103 performs the process 600. In addition or alternatively, the identity verification application 115 may perform all or a portion of the process 600.

In step 601, the identity verification platform 103 determines an identity claim associated with the user, the one or more respective network sessions, or a combination thereof. For example, an identity claim may be made by a user as part of engaging in a transaction. One example use case where a notary may participate is the purchase of a home. In this use case, a user may make an identity claim as part of executing contracts, titles, deeds, surveys, mortgages, affidavits, bank and tax documents, etc. It is contemplated an identity claim may be made to the identity verification platform 103 under any context where such a claim is currently made to human notaries.

In step 603, the identity verification platform 103 validates the identity claim using multi-sensor multi-factor biometric data. By way of example, like a person proving his or her identity to another human, the identity verification platform 103 (e.g., when operating an eNotary service) validates the identity claim with data. These data include, for instance, biometric data as well as more traditional forms of identification (e.g., physical identity artifacts such as a driver's license, passport, credit card, birth certificate, and other identity documents). For example, identity validation for eNotary services may be improved by exploiting mobile device capabilities (e.g., location, network and P2P sessions, microphones, cameras, etc.) and sensor technologies (e.g., human biometric and environmental sensors 105). It is noted that increasing proliferation of sensors makes human biometrics useful as identity data.

For example, as previously described, a surveillance camera in the environment can capture face recognition and/or walking stride and cadence (e.g., gait) biometrics. These data can be combined into composite biometrics based on the number and trust level of the various sensors and data. In one embodiment, the trust and confidence scores used to characterize the biometric data are calculated according to the process described previously with respect to FIG. 3. Examples of eNotary validation are described in further detail with respect to FIGS. 11A-11F.

In step 605, the identity verification platform 103 notarizes the identity claim based on the identity verification. For example, if an identity claim is validated, the identity verification platform 103 proceeds with electronically notarizing the claim and any associated documents, data, transactions, etc. In one embodiment, as part of the notarization process, the identity verification platform 103 encodes eNotary transaction data (e.g., including all audio, video, communications, identity validation data, etc.) with a serial number to ensure security, privacy, and/or integrity of the transaction and/or documents/content.

In one embodiment, eNotary transaction serial number (TSN) generation may include values such as hashes and/or checksums. In one embodiment, TSNs are globally unique and, in some cases, can be analogous to vehicle identification numbers (VINs). In one embodiment, eNotary TSNs prevent modification to the original eNotary content from which the TSNs are generated.

In one embodiment, the identity verification platform 103 can tag data used in the eNotary transaction (e.g., including documents, metadata, network information, identity validations/affirmations, TSNs, transaction logs, etc.). For example, tagging may include data classifications such as: (1) Unclassified (U), (2) Confidential (C), (3) Secret (S), (4) Top Secret (TS), etc. The tagging, for instance, can be used to determine what privacy, security, and/or sharing policies to apply to the transaction data. For example, the identity verification platform 103 can use the tagging to determine whether to retain or destroy the transaction data as appropriate. The tagging can also be used to enable sharing of the eNotary information based on user preferences, data classification, requestor ID, requestor ID verification and context, user privacy specifications, etc.

In one embodiment, as part of the notarization process, the identity verification platform 103 annotates eNotary transaction documents with an electronic version of the traditional notary "seal". In one embodiment, the seal may be applied using mechanisms similar to those that describe the TSNs above.

Figure 7:
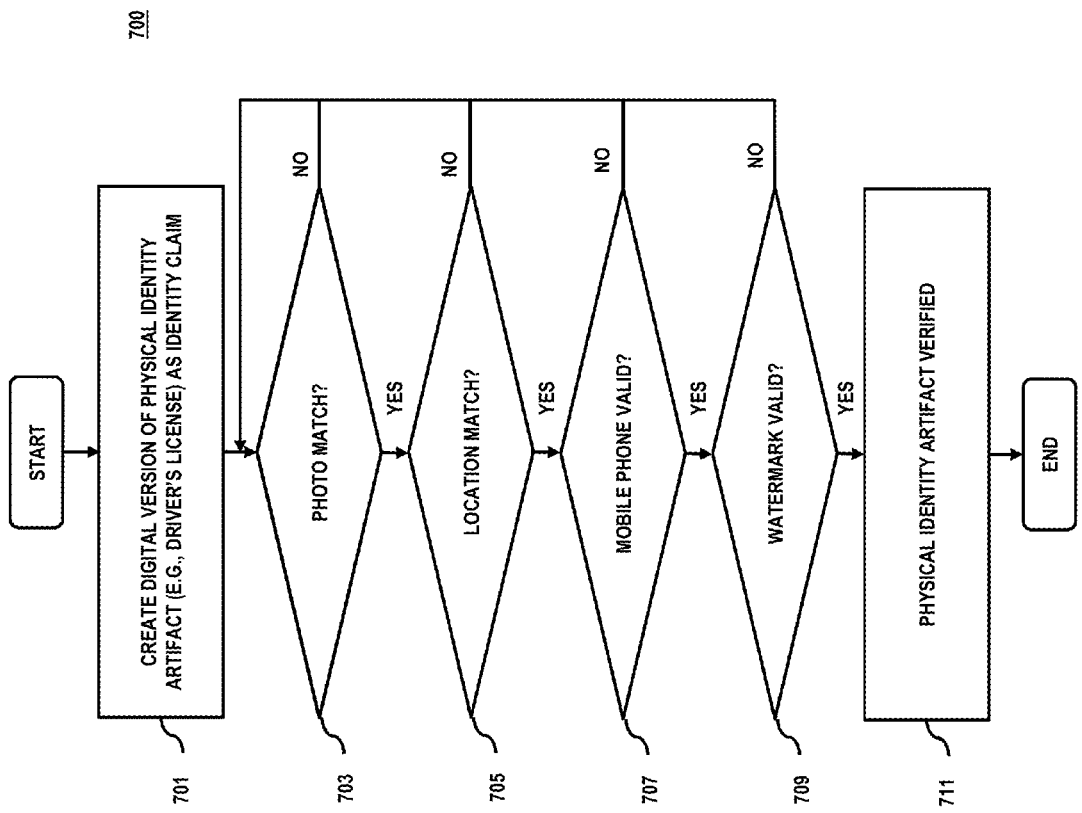
FIG. 7 is a flowchart of a process for providing an electronic notary service for physical identity artifacts based on multi-factor biometric data, according to one embodiment.

FIG. 7 is a flowchart of a process for providing an electronic notary service for physical identity artifacts based on multi-factor biometric data, according to one embodiment. For the purpose of illustration, process 700 is described with respect to FIG. 1. It is noted that the steps of the process 700 may be performed in any suitable order, as well as combined or separated in any suitable manner. In one embodiment, the identity verification platform 103 performs the process 700. In addition or alternatively, the identity verification application 115 may perform all or a portion of the process 700.

As previously describe, the identity verification platform 103 may validate physical identity artifacts as part of the eNotary process. In the example of FIG. 7 assumes that a user is initiating the eNotary service from a user device 101 located, for instance, in the user's primary residence. In step 701, the identity verification platform 103 receives an identity verification claim that is associated with a physical identity artifact (e.g., a driver's license), and creates a digital version of the physical identity artifact for processing. For example, an eNotary user presents a driver's license (DL) as an identity claim by taking a picture of or scanning the DL with a user device 101 (e.g., a mobile device, a personal computer, etc.). The scanned image can then be sent to the identity verification platform 103 to initiate an identity verification request.

In steps 703 to 709, the identity verification platform 103 performs various verification checks on the scanned or digital version of the artifact. For example, in step 703, the identity verification platform 103 determines whether there is a photographic match of any images in the artifact against known images (e.g., face recognition, object recognition, etc.). In one embodiment, the photographic match may be made with a face or a feature (e.g., eyebrows, ears, iris, etc.) the user photographed in the identity artifact. In addition or alternatively, the identity verification platform 103 can also compare a signature present on the artifact against a signature collected from the user (e.g., by signing on the screen of the user device 101).

In step 705, the identity verification platform 103 determines whether there is a location match between any parsed location from the digitized artifact against a present location or other known locations of the user. For example, the identity verification platform 103 can process the digital artifact using optical image recognition to determine a user address. The platform 103 can then obtain location information for the user device 101 to determine whether the recognized address matches the obtained location information.

In step 707, the identity verification platform 103 determines whether the user device 101 (e.g., a mobile phone) capturing an image of the physical artifact is valid. For example, if a user's mobile telephone number is listed on the artifact, the identity verification platform 103 can recognized the number from the scanned image and then verify the number. Validation, for instance, may include sending a text message to the mobile number listed and requesting a reply from the user. In one embodiment, the reply content that is to be submitted in the reply text message may be presented on another device 101 accessible to the user (e.g., the user's PC). For example, the user would have to enter whatever content is displayed on the other device into the text message reply. Additionally or alternatively, correlation of the user's mobile phone and the mobile phone number associated with the physical artifact (e.g., credit card) may be determined (e.g., the user's mobile phone number may be verified as the same as the mobile phone number on record with the user's credit card).

In step 709, the identity verification platform 103 determines whether any watermarks embedded in the physical artifacts are valid. In one embodiment, the digital or scanned image of the artifact may have the watermark visible. In this case, the watermark can be compared against reference watermarks expected in the artifact to determine validity. In some cases, the watermark may not be visible or otherwise obscured when scanned or imaged. In this case, special scanners or imagers (e.g., usually available from authorities issuing the identity artifact) can be used to validate the watermark. Additionally or alternatively, forms of digital watermarks, e.g., NFC data, may be used.

In step 711, the identity verification platform 103 analyzes the results of the verification checks performed in steps 703-709 to determine whether the physical identity artifact is verified. In one embodiment, the identity verification platform 103 may require the digitized artifact to pass all checks. In other embodiments, the identity verification platform 103 may verify the identity of the physical identity artifact even if it passes only some of the checks of steps 703-709. It is also noted that the checks of steps 703-709 are provided by way of example and is not intended to be limiting. In addition, it is contemplated that the identity may apply only a subset of the checks or provide for alternate of substitute checks. In one embodiment, the identity verification platform 103 may also make the types of checks to apply depending on the type of physical artifact that is being evaluated. For example, a driver's license may evoke one set of checks, while a passport evokes another set.

In one embodiment, other forms of physical identity artifacts (e.g., credit card, passport, etc.) may be verified similarly. Credit card verification, for example, may: (1) utilize security questions instead of validating a watermark; (2) verify the user's signature with that on the credit card; (3) verify the user's mobile phone number with that associated with the credit card; etc. In one embodiment, verification of multiple physical forms of identity can increase the confidence in identity verification.

As previously noted, some biometrics (e.g., voice biometrics, face biometrics, etc.) depend on some form of enrollment. By way of example, biometric enrollment may occur at appropriate times (and possibly at appropriate places, like a government office, a passport issuance center, etc.). In one embodiment, the physical identity artifact verification process of FIG. 7 may be used to verify a user's identity for purpose of enrolling biometric data (e.g., voice print, face, fingerprint, etc.).

An example of a voice and face biometric enrollment session using a user device 101 is to have the verified user speak the digits 0 through 9 while captured by a microphone and camera of the user device 101. Once enrolled, the user can be verified by voice, face, periocular, etc. and/or by multiple factors (e.g., voice+face).

Figure 8:
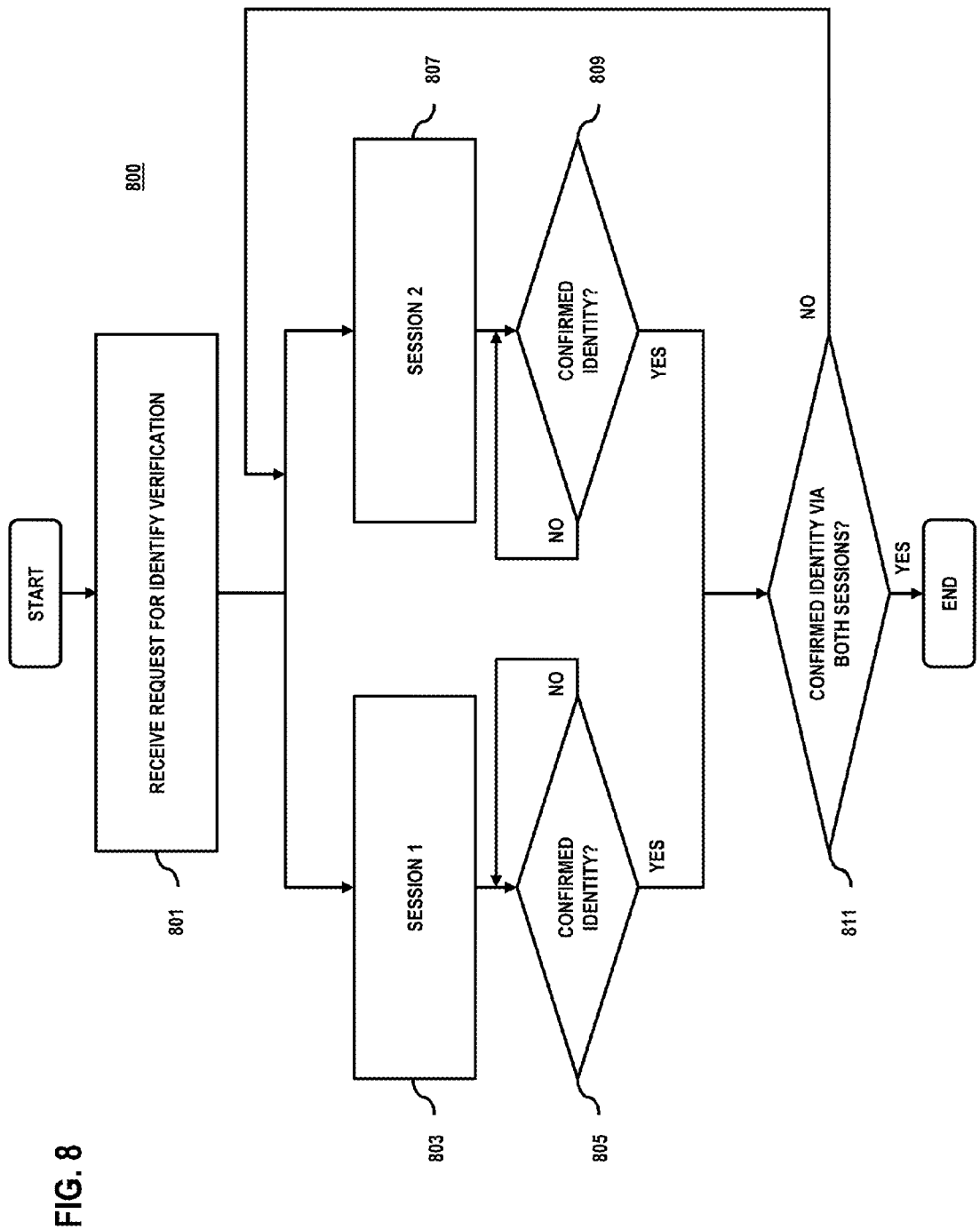
FIG. 8 is a flowchart of a process for providing session diversity for identity verification, according to one embodiment.

FIG. 8 is a flowchart of a process for providing session diversity for identity verification, according to one embodiment. For the purpose of illustration, process 800 is described with respect to FIG. 1. It is noted that the steps of the process 800 may be performed in any suitable order, as well as combined or separated in any suitable manner. In one embodiment, the identity verification platform 103 performs the process 800. In addition or alternatively, the identity verification application 115 may perform all or a portion of the process 800.

In one embodiment, the identity verification platform 103 can use either network diversity or session diversity to enhance identity verification. For example, in step 801, the identity verification platform 103 receives a request for identity verification and decides to perform multi-sensor multi-factor identity verification over two sessions. It is noted that although the example of FIG. 8 describes a two-session identity verification, it is contemplated that the identity verification platform 103 can use any number of sessions for identity verification.

In step 803, the identity verification platform 103 initiates a first network session for identity verification. For example, the identity verification platform 103 determines a first set of the biometric data through a first one of the one or more respective network sessions. The identity verification platform 103 then performs the identity verification on the first set of biometric data to confirm the user's identity (step 805).

In step 807, the identity verification platform 103 determines a second set of the biometric data through a second one of the one or more respective network sessions. Similar to the process above, the identity verification platform 103 performs the identity verification on the second set of the biometric to confirm the user's identity (step 809).

In step 811, the identity verification platform 103 determines whether both sessions result in confirmation of the user's identity. If the user's identity is verified over both sessions, then the identity verification confirms the user's identity. If either or both of the sessions result in no confirmation of the user's identity, then the process can repeat with another session and/or the identity verification platform 103 can display an identity verification failure message.

Figure 9:
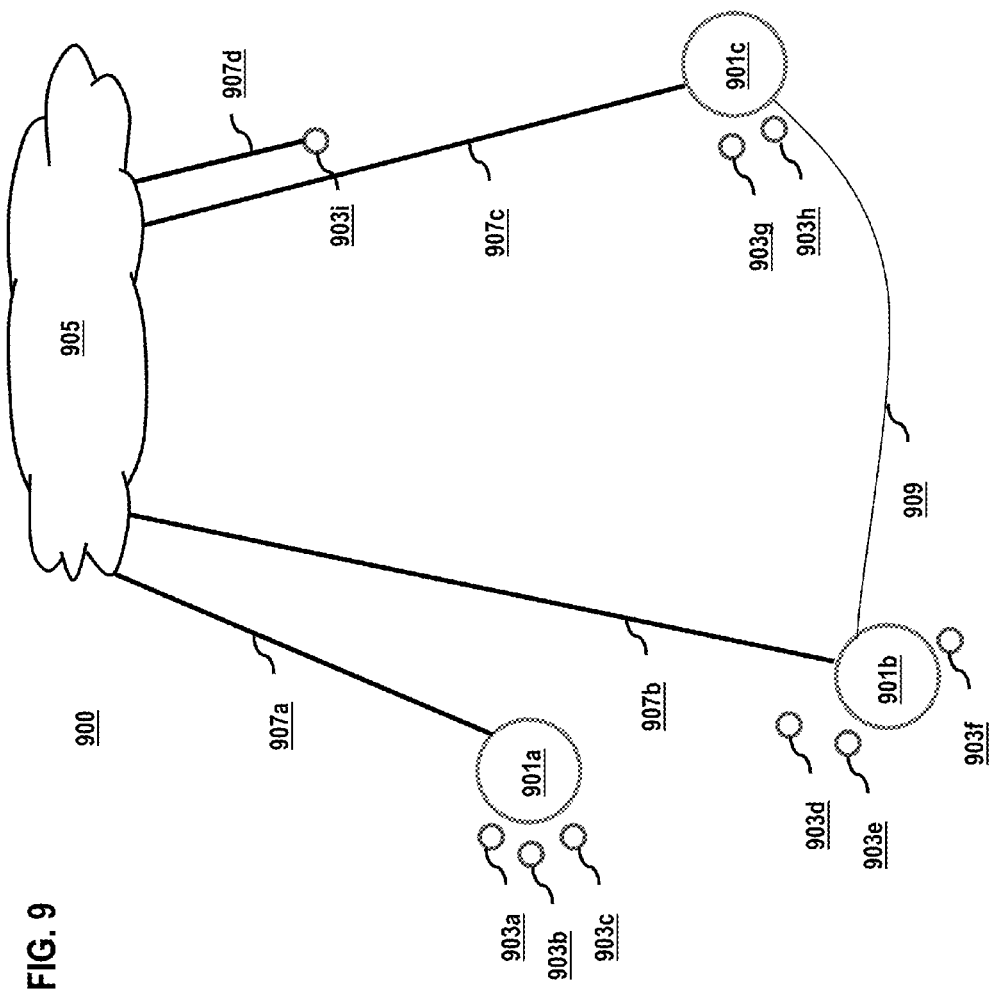
FIG. 9 is a diagram of a biometric sensor network with peer-to-peer and client-server communications, according to one embodiment.

FIG. 9 is a diagram of a biometric sensor network with peer-to-peer and client-server communications, according to one embodiment. As shown in FIG. 9, a system 900 comprises sensor networks 901a-901c, associated sensors 903a-903i, and a network 905. In one embodiment, sensor networks 901a-901c may contain relationships between sensors 903a-903i (e.g., connected via P2P connection 909) and other networks (e.g., connected via client-server connections 907a-907d). By way of example, sensor relationships may be quantified using mathematical methods including, transitivity, associativity, equals, greater than, less than, etc. Additionally trust may be federated and measured and/or negotiated between sensors 903a-903a and sensors networks 901a-0901b (e.g., similar to SIP CODEC negotiation).

In one embodiment, sensor context may also be used to calculate sensor and network trust scores. Sensor context, for instance, may include data like network connection and/or session status, sensor location, network connect time, data transported, number of network problems (e.g., connect, timeouts, re-syncs, etc.), number of content problems, signal strength, etc.

In one embodiment, organic models of sensor relationships (e.g., P2P relationships 909) can be used to show or model evolutionary origins of sensor networks. For example, organic models can predict the interdependence of the component parts of the system 900 as well as their differentiation to calculate trust and confidence relationships among the sensors 903a-903i and/or the sensor networks 901a-901c. Such organic modeling can simplify trust calculations, particularly as the system 900 increases in complexity and number of component parts.

Figure 10A:
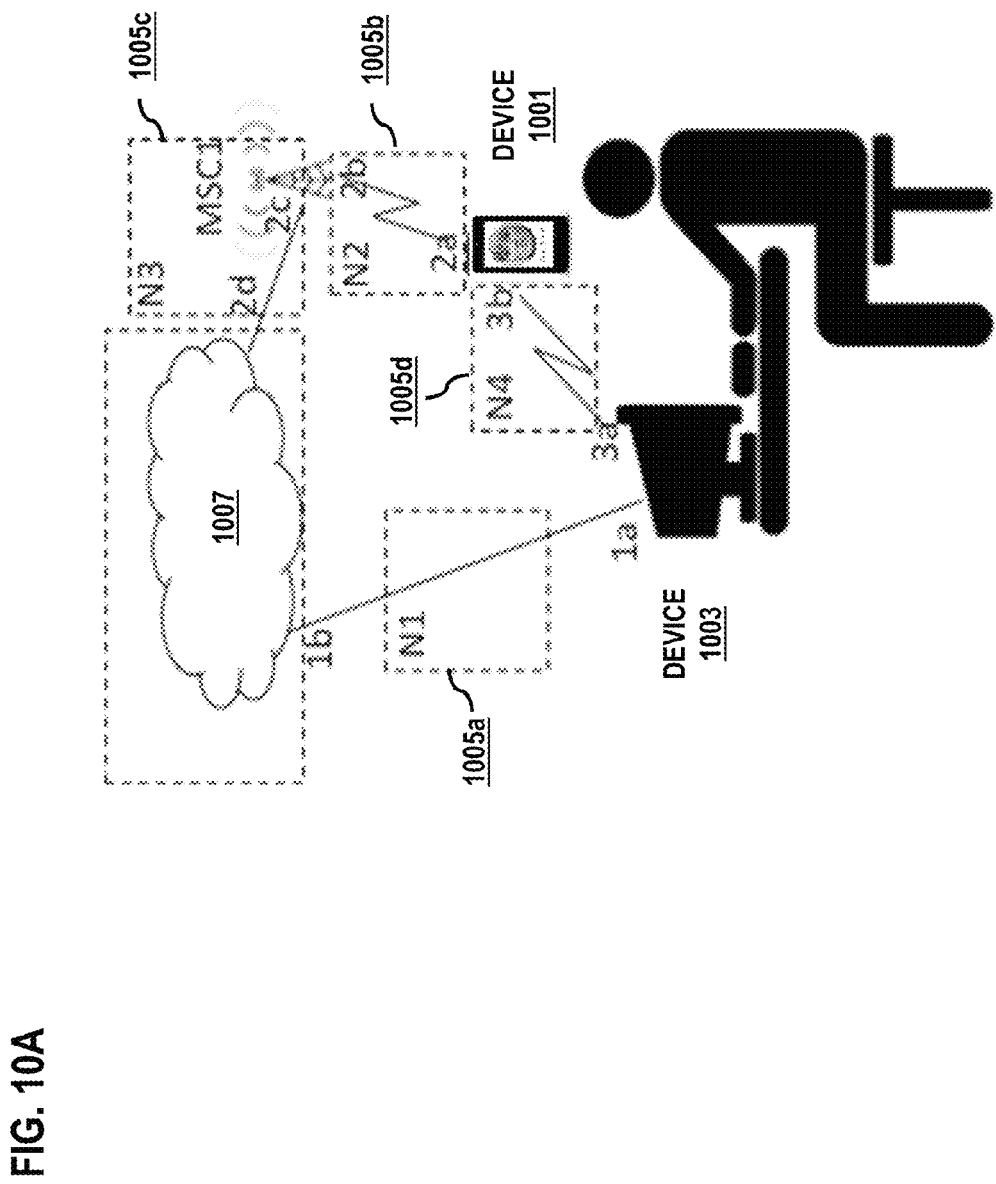
FIGS. 10A-10D are diagrams illustrating example network communications and sources used in trust score calculations, according to various embodiments.

FIGS. 10A-10D are diagrams illustrating example network communications and sources used in trust score calculations, according to various embodiments. FIG. 10A shows an example of factors in a biometric sensor including multiple devices (e.g., devices 1001 and 1003) IP addresses, communication ports, and communications networks 1005a-1005d with connectivity to a backend system 1007. These components or elements, in turn, form at least three communication legs from which the system 100 can compute separate trust or confidence scores.

For example, a first leg spans Device 1003-to-System 1007 via a path consisting of [Device 1003]-[Device 1003 Port 1a]-[Network 1005a]-[System 1007 Port 1b]-[System 1007]. In one embodiment, the trust or confidence scores for this leg are calculated based on the components in the path described above.

A second leg spans Device 1001-to-System 1007 via a path consisting of [Device 1001]-[Device 1001 Port 2a]-[Network 1005b Port 2b]-[Network 1005c Port 2c]-[System 1007 Port 2d]-[System 1007]. A third leg spans Device 1003-to-Device 1001 via a path consisting of [Device 1003]-[Network 1005d Port 3a]-[Device 1001 Port 3b]-[Device 1001]. As with the first leg, the trust and confidence scores for the second and third legs can be calculated based on the individual components of each leg. Because the paths are different, the resulting trust and confidences are also likely to be different depending on the characteristics of the respective components.

Figure 10B:
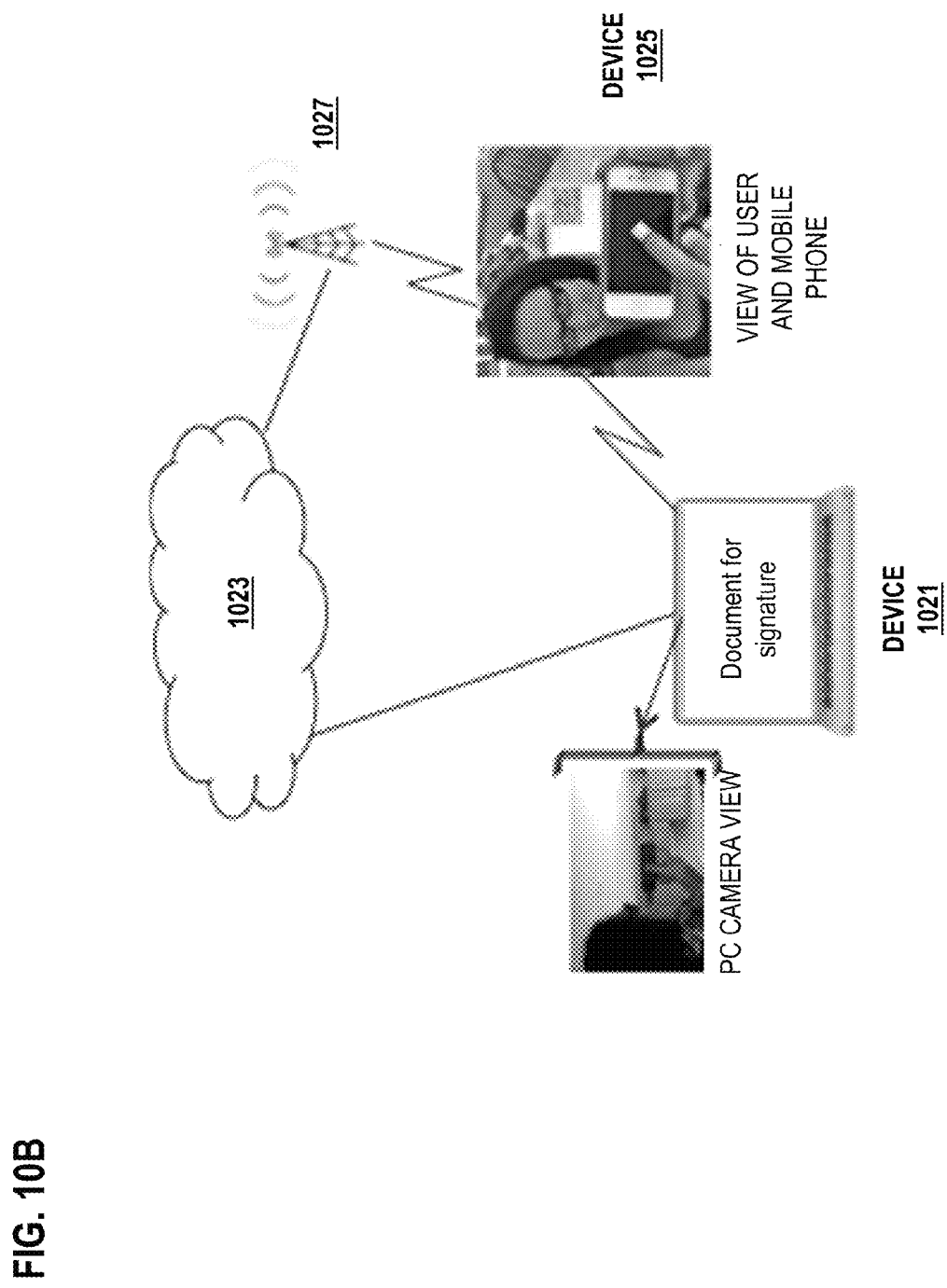

FIG. 10B is a diagram illustrating an eNotary sample use case, according to one embodiment. As shown in FIG. 10B, a user with a PC device 1021 is performing an eNotary action supported by eNotary service 1023. For example, the user is attempting to first confirm and then eSign an affidavit that the user is who the user claims to be. Then, the user intends to eSign a transaction (e.g., a closing, a course completion, etc.) based on the notarized affidavit.

In this example, the eNotary user has made an identity claim on the user's PC device 1021 and is instructed by the eNotary service 1023 to confirm and eSign an affidavit (e.g., a sworn statement of fact) confirming the user is who the user claims to be. In one embodiment, eNotary service 1021 employs a multi-factor approach to identity verification using a combination of the following:

(1) username and password (e.g., on the PC device 1021 and/or the mobile device 1025);

(2) voice biometrics (e.g., on the PC device 1021 and/or the mobile device 1025);

(3) face biometrics (e.g., on the PC device 1021 and/or the mobile device 1025);

(4) fingerprint biometrics (e.g., on the PC device 1021 and/or the mobile device 1025); and (5) QR code, e.g., on PC device 1021 validated by mobile device 1025 over wireless network 1027.

By using both the PC device 1021 and mobile device 1025, the system 100 employs session diversity for biometric confirmation of the user's identity because the PC device 1021 is connected directly to the eNotary service 1023 whereas the mobile device 1025 is connected via wireless network 1027.

Figure 10C:
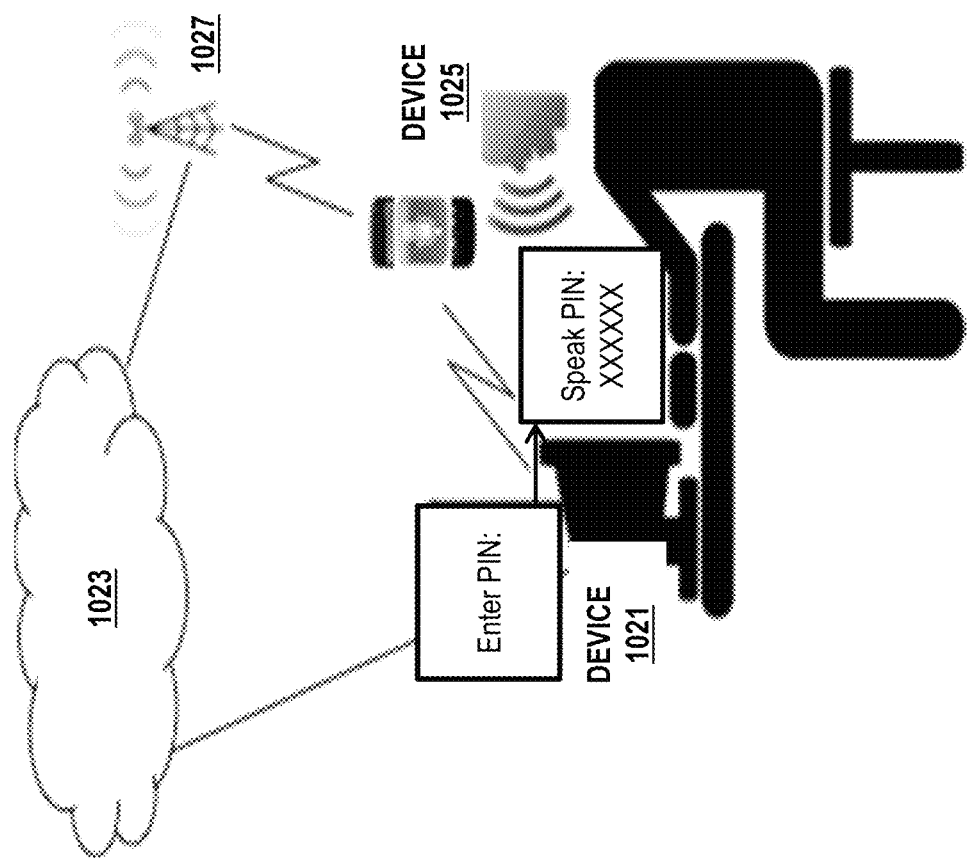

FIG. 10C is a diagram illustrating an eNotary sample use case using a security token, according to one embodiment. FIG. 10C depicts the same components and user as described with respect to FIG. 10B. However, in the example of FIG. 10C, a (software) security token is added which requests a PIN entered via the PC device 1021. The passcode is displayed for a period of time (e.g., 60 seconds) and the user is requested to speak the PIN code. As the user speaks the PIN code, the PC device 1021 and/or the mobile device 1025 may perform speech recognition. At the same time, speech biometric verification is performed on the spoken PIN. Additionally, the PC device 1021 and/or the mobile device 1025 may employ cameras or other sensors to capture additional data (e.g., biometric data) as the transaction progresses. The system 100 can then use these multiple sensor sources for multi-sensor multi-factor identity recognition.

Figure 10D:
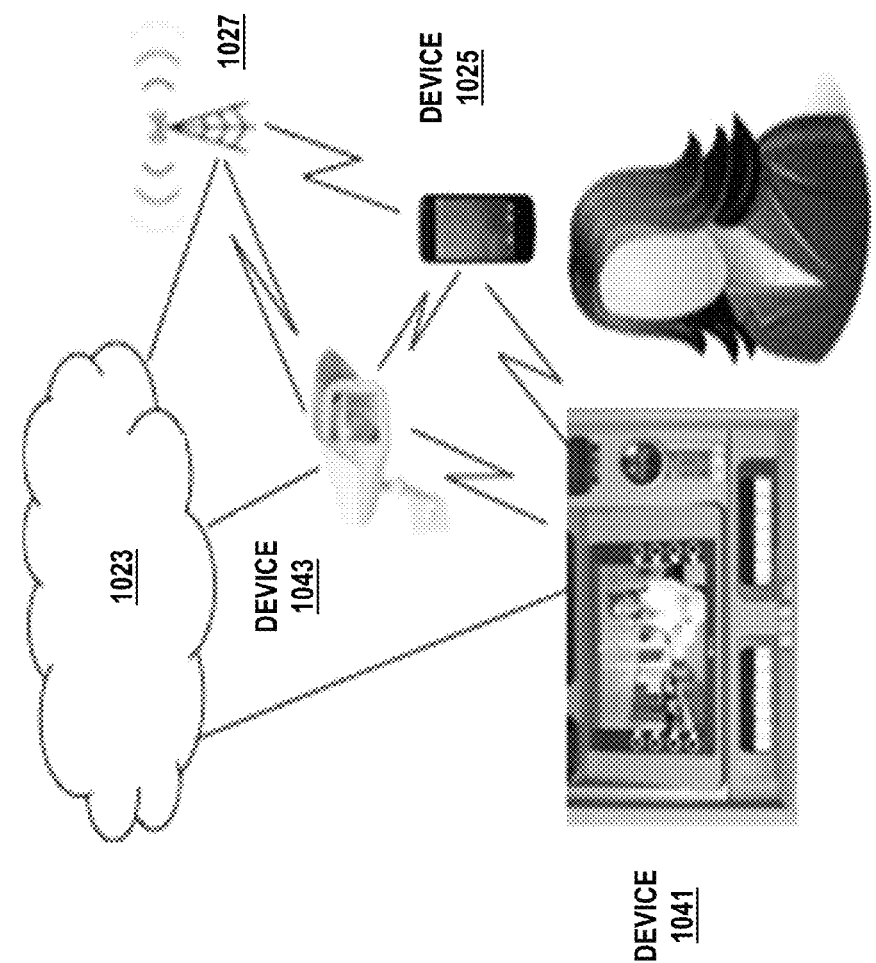

FIG. 10D is a diagram illustrating an eNotary sample use case using an automated notary machine (ANM), according to one embodiment. In this example, an eNotary user goes to an ANM device 1041 (alternatively, the ANM could go to the user). By way of example, the ANM device 1041 is a dedicated device that performs eNotary functions in conjunction with the eNotary service 1023. As shown, a surveillance camera device 1043 is added to the eNotary transaction to provide additional sensor data for identity verification. For example, in addition to the identity verification means described with respect to the FIGS. 10B and 10C, the eNotary service 1023 may also use images captured by the camera device 1043 to perform face recognition, gait recognition, etc. as the user approaches the ANM device 1041. The biometric information collected by the camera device 1041 can be used in combination with biometric data collected by the ANM device 1041 and/or the mobile device 1025 to increase the confidence of the user's identity verification.

For example, as previously discussed, the mobile device 1025 can be used for multi-factor identity verification using voice and face on a mobile. In this scenario, the user speaks a specified three-digit challenge phrase displayed on the mobile. This speaking test is an example of a "live-ness test" that is for preventing use of a pre-recorded picture, video, or speech to perform fraudulent identity verification. In one embodiment, the live-ness test can be incorporated as a sub-step in the identity verification processes described above.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The processes described herein for verification of a user's identity from mobile devices can be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
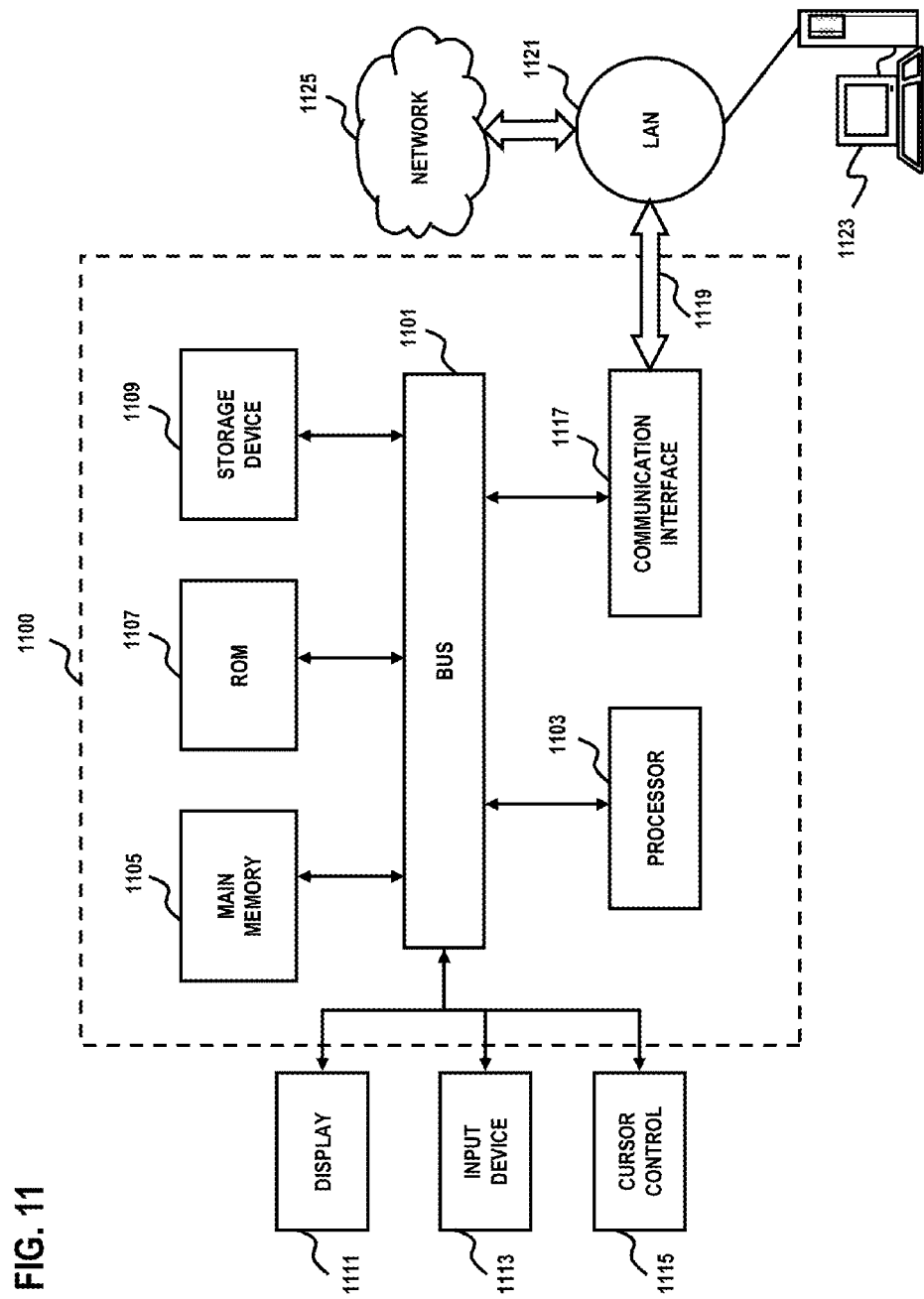
FIG. 11 is a diagram of a computer system that can be used to implement various exemplary embodiments.

FIG. 11 illustrates computing hardware (e.g., computer system) upon which an embodiment according to the invention can be implemented. The computer system 1100 includes a bus 1101 or other communication mechanism for communicating information and a processor 1103 coupled to the bus 1101 for processing information. The computer system 1100 also includes main memory 1105, such as random access memory (RAM) or other dynamic storage device, coupled to the bus 1101 for storing information and instructions to be executed by the processor 1103. Main memory 1105 also can be used for storing temporary variables or other intermediate information during execution of instructions by the processor 1103. The computer system 1100 may further include a read only memory (ROM) 1107 or other static storage device coupled to the bus 1101 for storing static information and instructions for the processor 1103. A storage device 1109, such as a magnetic disk or optical disk, is coupled to the bus 1101 for persistently storing information and instructions.

The computer system 1100 may be coupled via the bus 1101 to a display 1111, such as a cathode ray tube (CRT), liquid crystal display, active matrix display, organic light-emitting diode (OLED) display, active-matrix organic light-emitting diode (AMOLED) display, or plasma display, for displaying information to a computer user. An input device 1113, such as a keyboard including alphanumeric and other keys, is coupled to the bus 1101 for communicating information and command selections to the processor 1103. Another type of user input device is a cursor control 1115, such as a mouse, a trackball, or cursor direction keys, for communicating direction information and command selections to the processor 1103 and for controlling cursor movement on the display 1111.

According to an embodiment of the invention, the processes described herein are performed by the computer system 1100, in response to the processor 1103 executing an arrangement of instructions contained in main memory 1105. Such instructions can be read into main memory 1105 from another computer-readable medium, such as the storage device 1109. Execution of the arrangement of instructions contained in main memory 1105 causes the processor 1103 to perform the process steps described herein. One or more processors in a multi-processing arrangement may also be employed to execute the instructions contained in main memory 1105. In alternative embodiments, hard-wired circuitry may be used in place of or in combination with software instructions to implement the embodiment of the invention. Thus, embodiments of the invention are not limited to any specific combination of hardware circuitry and software.

The computer system 1100 also includes a communication interface 1117 coupled to bus 1101. The communication interface 1117 provides a two-way data communication coupling to a network link 1119 connected to a local network 1121. For example, the communication interface 1117 may be a digital subscriber line (DSL) card or modem, an integrated services digital network (ISDN) card, a cable modem, a telephone modem, or any other communication interface to provide a data communication connection to a corresponding type of communication line. As another example, communication interface 1117 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1117 sends and receives electrical, electromagnetic, or optical signals that carry digital data streams representing various types of information. Further, the communication interface 1117 can include peripheral interface devices, such as a Universal Serial Bus (USB) interface, a PCMCIA (Personal Computer Memory Card International Association) interface, etc. Although a single communication interface 1117 is depicted in FIG. 11, multiple communication interfaces can also be employed.

The network link 1119 typically provides data communication through one or more networks to other data devices. For example, the network link 1119 may provide a connection through local network 1121 to a host computer 1123, which has connectivity to a network 1125 (e.g. a wide area network (WAN) or the global packet data communication network now commonly referred to as the "Internet") or to data equipment operated by a service provider. The local network 1121 and the network 1125 both use electrical, electromagnetic, or optical signals to convey information and instructions. The signals through the various networks and the signals on the network link 1119 and through the communication interface 1117, which communicate digital data with the computer system 1100, are exemplary forms of carrier waves bearing the information and instructions.

The computer system 1100 can send messages and receive data, including program code, through the network(s), the network link 1119, and the communication interface 1117. In the Internet example, a server (not shown) might transmit requested code belonging to an application program for implementing an embodiment of the invention through the network 1125, the local network 1121 and the communication interface 1117. The processor 1103 may execute the transmitted code while being received and/or store the code in the storage device 1109, or other non-volatile storage for later execution. In this manner, the computer system 1100 may obtain application code in the form of a carrier wave.

The term "computer-readable medium" as used herein refers to any medium that participates in providing instructions to the processor 1103 for execution. Such a medium may take many forms, including but not limited to non-volatile media, volatile media, and transmission media. Non-volatile media include, for example, optical, solid-state, or magnetic disks, such as the storage device 1109. Volatile media include dynamic memory, such as main memory 1105. Transmission media include coaxial cables, copper wire and fiber optics, including the wires that comprise the bus 1101. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, solid-state disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 12:
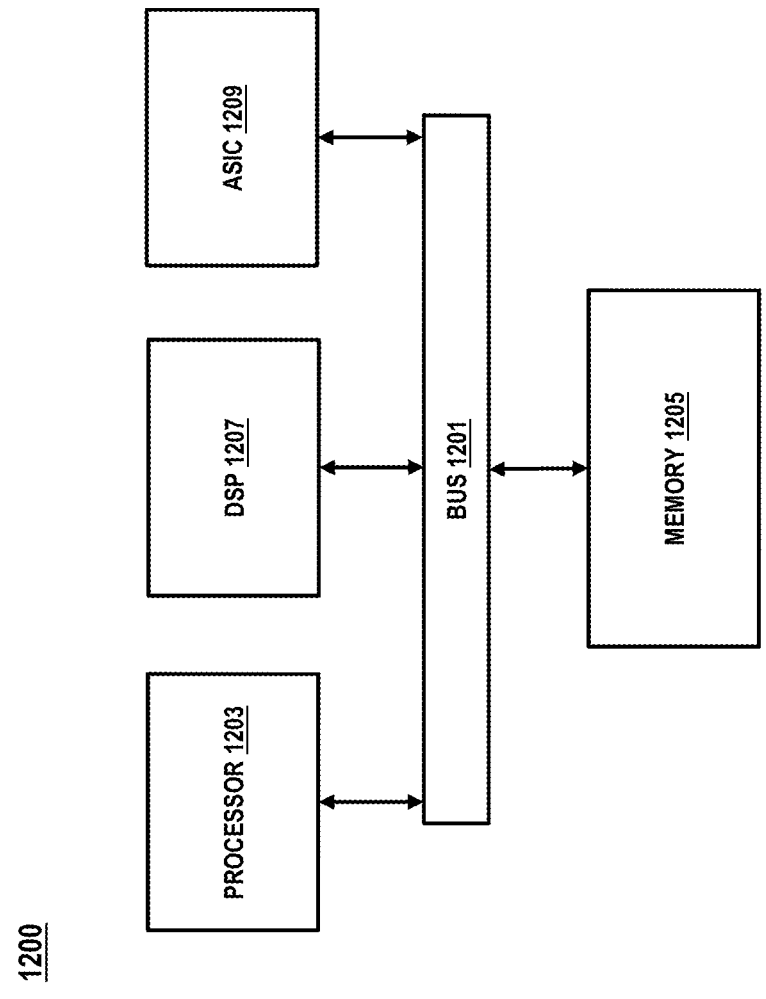
FIG. 12 is a diagram of a chip set that can be used to implement various exemplary embodiments.

FIG. 12 illustrates a chip set 1200 upon which an embodiment of the invention may be implemented. Chip set 1200 is programmed to verify a user's identity, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of FIGS. 3-8.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, flash memory, etc.) and static memory (e.g., ROM, CD-ROM, etc.) for storing executable instructions that when executed perform the inventive steps described herein to perform multi-sensor multi-factor biometric identity verification. The memory 1205 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   determining biometric data associated with a user from one or more sources, wherein the one or more sources are associated with one or more respective network sessions, and
   wherein the one or more respective network sessions include communications sessions from the one or more sources providing the biometric data;
   generating one or more respective trust scores for the one or more sources and for the one or more respective network sessions based on one or more contextual parameters associated with the user, the one or more sources, the one or more respective network sessions, or a combination thereof,
   wherein the one or more respective trust scores for the one or more respective network sessions are associated with signal characteristics of the communication sessions providing the biometric data,
   wherein the signal characteristics include strength of signal, communication loss, or combination thereof; and
   verifying an identity of the user based on the biometric data and the one or more respective trust scores.

2. A method of claim 1, further comprising:
   determining one or more confidence scores for one or more respective legs of the one or more network sessions,
   wherein the one or more respective trust scores are further based on the one or more confidence scores.

3. A method of claim 1, further comprising:
determining a first set of the biometric data through a first one of the one or more respective network sessions; and
determining a second set of the biometric data through a second one of the one or more respective network sessions,
wherein the verifying of the identity of the user is further based on the first set and the second set.

4. A method of claim 1, further comprising:
processing the biometric data to determine duress information associated with the user,
wherein the duress information affects the one or more respective trust scores for the one or more sources and is used in verifying the identity of the user and the duress information is reported to the user or third parties.

5. A method of claim 1, further comprising:
determining non-biometric data associated with the user, an environment associated with the user, or a combination thereof,
wherein the verifying of the identity of the user is further based on the non-biometric data.

6. A method of claim 1, further comprising:
determining an identity claim associated with the user, the one or more respective network sessions, or a combination thereof; and
notarizing the identity claim based on the verifying of the identity, the biometric data, the one or more respective trust scores, or a combination thereof.

7. A method of claim 6, wherein the identity claim is associated with a document, a transaction, a physical identity artifact, or a combination thereof.

8. A method of claim 1, further comprising:
creating a personal health record for the user based on the biometric data, the verifying of the identity, or a combination thereof.

9. A method of claim 8, further comprising:
causing a semantic tagging of the personal health record, the biometric data, or a combination thereof; and
determining a privacy policy, a security policy, or a combination thereof for the personal health record, the biometric data, or a combination thereof based on the semantic tagging.

10. A method of claim 1, wherein the one or more sources include a device sensor, a network-based location associated with the user, a communication history associated with the user, or combination thereof.

11. An apparatus comprising:
a processor configured to:
determine biometric data associated with a user from one or more sources, wherein the one or more sources are associated with one or more respective network sessions, and
wherein the one or more respective network sessions include communications sessions from the one or more sources providing the biometric data;
generate one or more respective trust scores for the one or more sources and for the one or more respective network sessions based on one or more contextual parameters associated with the user, the one or more sources, the one or more respective network sessions, or a combination thereof,
wherein the one or more respective trust scores for the one or more respective network sessions are associated with signal characteristics of the communication sessions providing the biometric data,
wherein the signal characteristics include strength of signal, communication loss, or combination thereof; and
verify an identity of the user based on the biometric data and the one or more respective trust scores.

12. An apparatus of claim 11, wherein the processor is further configured to:
determine one or more confidence scores for one or more respective legs of the one or more network sessions,
wherein the one or more respective trust scores are further based on the one or more confidence scores.

13. An apparatus of claim 11, wherein the processor is further configured to:
determine a first set of the biometric data through a first one of the one or more respective network sessions; and
determine a second set of the biometric data through a second one of the one or more respective network sessions,
wherein the verifying of the identity of the user is further based on the first set and the second set.

14. An apparatus of claim 11, wherein the processor is further configured to:
process the biometric data to determine duress information associated with the user,
wherein the duress information affects the one or more respective trust scores for the one or more respective network sessions and is used in verifying the identity of the user.

15. An apparatus of claim 11, wherein the processor is further configured to:
determine non-biometric data associated with the user, an environment associated with the user, or a combination thereof,
wherein the verifying of the identity of the user is further based on the non-biometric data.

16. An apparatus of claim 11, wherein the processor is further configured to:
determining an identity claim associated with the user, the one or more respective network sessions, or a combination thereof; and
notarizing the identity claim based on the verifying of the identity, the biometric data, the one or more respective trust scores, or a combination thereof.

17. A method of claim 11, wherein the processor is further configured to:
create a personal health record for the user based on the biometric data, the verifying of the identity, or a combination thereof.

18. A method of claim 17, wherein the processor is further configured to:
cause a semantic tagging of the personal health record, the biometric data, or a combination thereof; and
determine a privacy policy, a security policy, or a combination thereof for the personal health record, the biometric data, or a combination thereof based on the semantic tagging.

19. A system comprising:
a sensor device configured to determine biometric data associated with a user from one or more sources, wherein the one or more sources are associated with one or more respective network sessions, and
wherein the one or more respective network sessions include communications sessions from the one or more sources providing the biometric data; and
an identity verification platform configured to generate one or more respective trust scores for the one or more sources and the one or more respective network sessions based on one or more contextual parameters associated with the user, the one or more sources, the one or more respective network sessions, or a combination thereof, wherein the one or more respective trust scores for the one or more respective network sessions are associated with signal characteristics of the communication sessions providing the biometric data, wherein the signal characteristics include strength of signal, communication loss, or combination thereof; and verify an identity of the user based on the biometric data and the one or more respective trust scores.

20. A system of claim 19, wherein the identity verification platform is further caused to:
   determine one or more confidence scores for one or more respective legs of the one or more network sessions,
   wherein the one or more respective trust scores are further based on the one or more confidence scores.

\* \* \* \* \*